United States Patent
Misaka

(10) Patent No.: US 9,140,905 B2
(45) Date of Patent: Sep. 22, 2015

(54) VIBRATION PROOF ZOOM LENS AND PHOTOGRAPHING APPARATUS HAVING THE SAME

(75) Inventor: Makoto Misaka, Yokohama (JP)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 816 days.

(21) Appl. No.: 13/332,742

(22) Filed: Dec. 21, 2011

(65) Prior Publication Data

US 2012/0154913 A1    Jun. 21, 2012

(30) Foreign Application Priority Data

Dec. 21, 2010  (JP) ................................ 2010-284858
Nov. 23, 2011  (KR) ............................ 2011-0123237

(51) Int. Cl.
  *G02B 27/64*    (2006.01)
  *G02B 15/173*   (2006.01)

(52) U.S. Cl.
  CPC ............ *G02B 27/646* (2013.01); *G02B 15/173* (2013.01)

(58) Field of Classification Search
  CPC .............................. G02B 15/173; G02B 15/28
  USPC ................ 359/554–557, 676–690, 693–706, 359/772–790, 796–797
  See application file for complete search history.

(56) References Cited

U.S. PATENT DOCUMENTS

| | | | |
|---|---|---|---|
| 5,721,641 A | 2/1998 | Aoki | |
| 6,115,188 A * | 9/2000 | Nishio et al. | 359/690 |
| 7,050,242 B2 | 5/2006 | Adachi | |
| 7,609,460 B2 | 10/2009 | Suzaki et al. | |
| 7,782,544 B2 | 8/2010 | Hoshi | |
| 2004/0212898 A1 | 10/2004 | Adachi | |
| 2005/0030640 A1 | 2/2005 | Hirakawa | |
| 2005/0083584 A1* | 4/2005 | Ito et al. | 359/687 |
| 2005/0286139 A1 | 12/2005 | Nishimura | |
| 2006/0146417 A1 | 7/2006 | Hoshi | |
| 2006/0238891 A1* | 10/2006 | Ogata | 359/690 |
| 2007/0002443 A1* | 1/2007 | Toyama | 359/557 |

(Continued)

FOREIGN PATENT DOCUMENTS

| | | |
|---|---|---|
| CN | 1550817 | 12/2004 |
| CN | 1800899 | 7/2006 |

(Continued)

OTHER PUBLICATIONS

European Search Report Issued on Apr. 18, 2012 in EP Application No. 11194965.7.

(Continued)

*Primary Examiner* — Scott J Sugarman
*Assistant Examiner* — Jeffrey Madonna
(74) *Attorney, Agent, or Firm* — Staas & Halsey LLP

(57) ABSTRACT

In a vibration proof zoom lens 100, a third lens group G3 has a positive lens 7, a positive cemented lens 8, a negative cemented lens 9, which are arranged in order from an object side. In variable-magnifying from a wide angle limit to a telephoto limit, a clearance between a first lens group G1 and a second lens group G2 is increased and at the same time, a clearance between the second lens group G2 and a third lens groupG3 is decreased, a focusing from an infinity side to a close side is performed by moving the positive lens 7 toward an image, and a vibration proof is performed by moving the cemented lens 9 in a direction perpendicular to an optical axis to change an image position.

15 Claims, 31 Drawing Sheets

(56) References Cited

U.S. PATENT DOCUMENTS

| | | | |
|---|---|---|---|
| 2007/0183042 A1* | 8/2007 | Mizuguchi | 359/557 |
| 2008/0088950 A1* | 4/2008 | Endo | 359/785 |
| 2009/0141352 A1 | 6/2009 | Jannard et al. | |
| 2009/0244720 A1* | 10/2009 | Yamaguchi | 359/690 |
| 2010/0091174 A1 | 4/2010 | Miyazaki et al. | |
| 2010/0289926 A1* | 11/2010 | Tanaka | 348/240.3 |

FOREIGN PATENT DOCUMENTS

| | | |
|---|---|---|
| EP | 1477837 | 11/2004 |
| EP | 2045637 | 4/2009 |
| JP | 10133109 | 5/1998 |
| JP | 10133111 | 5/1998 |
| JP | 2006-085155 | 3/2006 |
| JP | 2006106191 | 4/2006 |
| JP | 2006-284763 | 10/2006 |
| JP | 2009-157067 | 7/2009 |
| JP | 2010-044372 | 2/2010 |
| JP | 2010-113179 | 5/2010 |
| JP | 2011-090185 | 5/2011 |

OTHER PUBLICATIONS

Japanese Office Action issued in Application No. 2010-284858 on Jun. 17, 2014.

European Search Report in application No. 11194965.7 dated Aug. 6, 2012.

Chinese Office Action Dec. 24, 2014 in Chinese Patent Application No. 201110451056.5.

* cited by examiner

FIG. 1
A
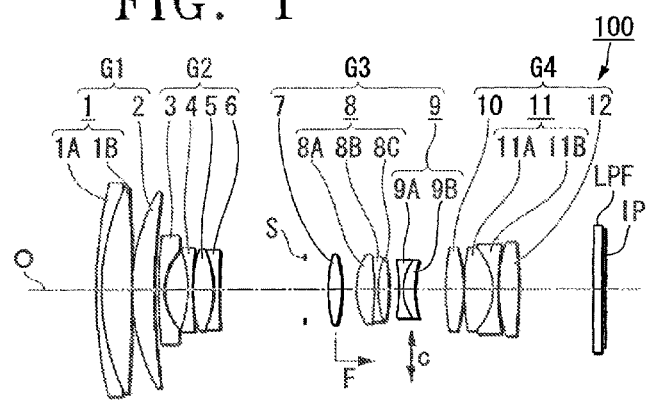
B
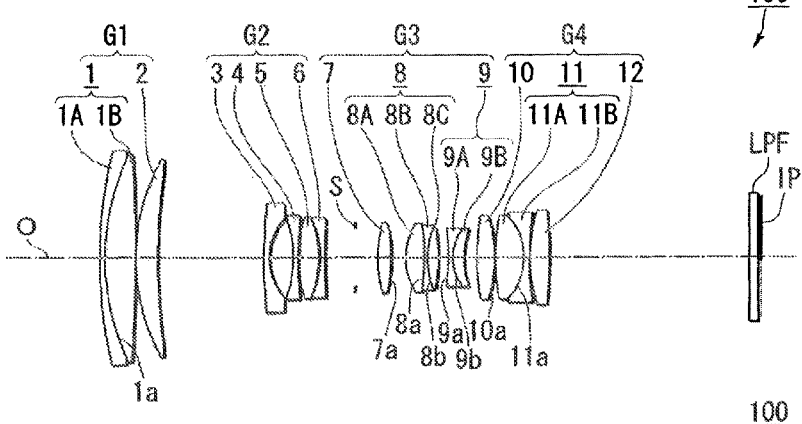
C
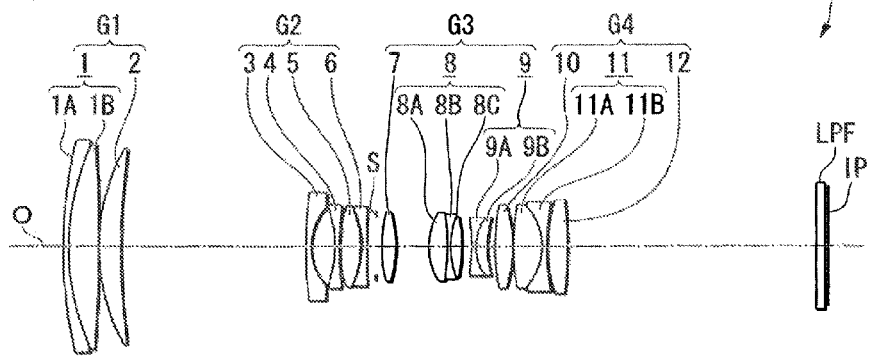

FIG. 3
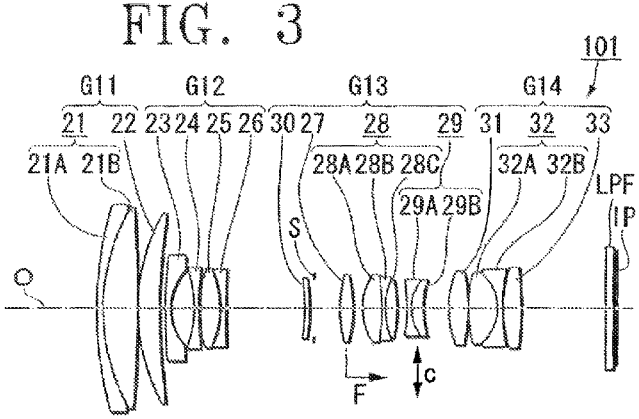
A
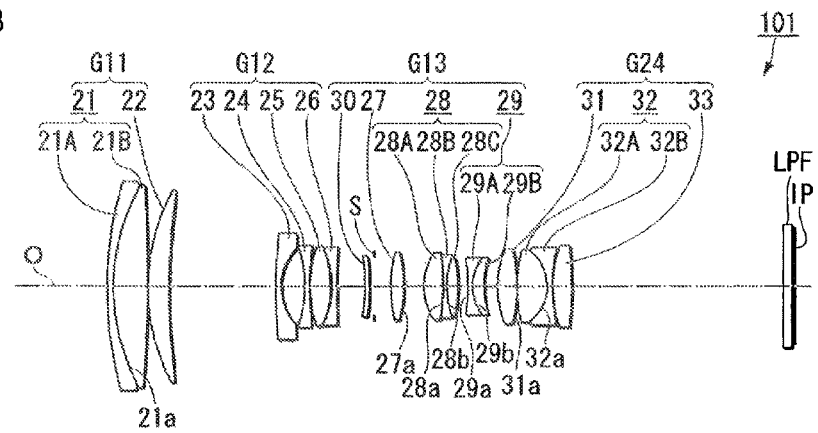
B
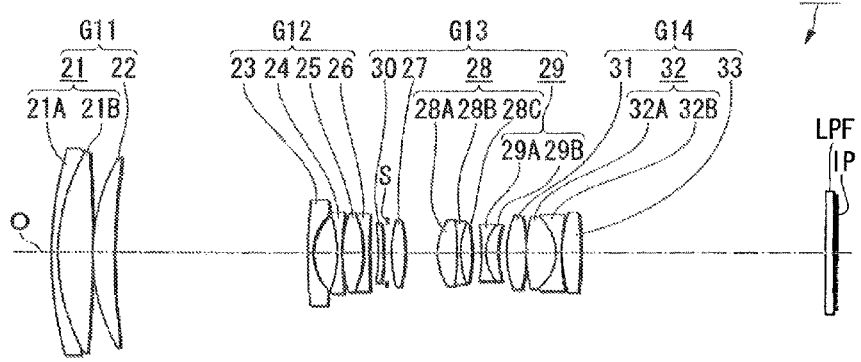
C

VIBRATION PROOF ZOOM LENS AND PHOTOGRAPHING APPARATUS HAVING THE SAME

CROSS-REFERENCE TO RELATED APPLICATIONS

This application claims priority from Japanese Patent Application No. 2010-284858, filed Dec. 21, 2010, in the Japan Intellectual Property Office, and Korean Patent Application No. 2011-0123237, filed on Nov. 23, 2011, in the Korean Intellectual Property Office, the disclosures of which are incorporated herein by reference in its entirety.

BACKGROUND OF THE INVENTION

1. Field of the Inventive Concept

Apparatuses and methods consistent with the present inventive concept relate to a vibration proof zoom lens and a photographing apparatus having the same.

2. Description of the Related Art

There have been proposed various zoom lenses with a device (vibration-proofing apparatus) compensating for image shaking caused by vibrations fortuitously transmitted to a photographing system. For instance, there is known a zoom lens (vibration proof zoom lens), in which to compensate for the image shaking caused by the vibrations, moves a portion of lens groups forming the zoom lens in a vertical direction to an optical axis.

Examples of such a zoom lens are disclosed in, for example, Japanese Patent Laid-open Nos. 2006-106191 and 2009-284763. The disclosed zoom lenses (vibration proof zoom lenses), which have a vibration proof function, are composed of a first lens group with a positive refractive power, a second lens group with a negative refractive power, a third lens group with a positive refractive power, and a fourth lens group with a positive refractive power, which are arranged in order from an object side, respectively. The third lens group consists of a front group with a positive refractive power and a rear group with a negative refractive power, and the rear group is moved in the vertical direction to the optical axis to compensate for the image shaking.

In the zoom lenses disclosed in Japanese patent laid-open Nos. 2006-106191 and 2009-284763, a focusing operation from a far distance to a close distance is performed by moving the second lens group toward the object side.

On the other hand, there are known various methods of focusing the zoom lens to the close distance. For instance, there is known an optical system in which a most front lens can be restrained in diameter and which as a zoom lens desirable for high variable-magnifying or zooming, has a first lens group with a positive refractive power, a second lens group with a negative refractive power and a third lens group with a positive lens refractive power arranged in order from the object side (see, for example, Japanese Patent Laid-open Nos. H10-133109 and H10-133111). In the optical system, the focusing is performed at the third lens group.

In the conventional vibration proof zoom lenses as described above, however, problems have been discovered, as follows:

The zoom lenses disclosed in Japanese patent laid-open Nos. 2006-106191 and 2009-284763 perform the focusing by moving the second lens group. In the zoom lenses, however, since the second lens group with the negative refractive power preceding the first lens group with the positive refractive power generally contributes to a major variable magnification among the entire optical system, it has a relatively large number of lenses, and is large even in mass. For instance, the second lens group disclosed in the Japanese patent laid-open Nos. 2006-106191 and 2009-284763 is composed of four lenses, which include a negative meniscus lens having a convex surface toward the object side, a bi-concave lens, a bi-convex lens and a negative meniscus lens having a concave surface toward the object side.

On this account, there are problems in that it is difficult to control the second lens group to move forward and rearward in very small amounts and is not adapted to, particularly, a so-called contrast detection type auto focus by a blur detection of an image pickup device.

Also, the zoom lenses disclosed in Japanese Patent Laid-open Nos. H10-133109 and H10-133111 perform the focusing at the third lens group with a positive refractive power. In the zoom lenses, however, since the third lens group is composed of three cemented lens, each of in which a positive lens, a positive lens and a negative lens are cemented with one another, there are problems in that this third lens group also has a relatively large number of lenses and is not adapted to, particularly, the so-called contrast detection type auto focus.

On this account, there is a need for a vibration proof zoom lens, which establishes a sufficient close distance while having a high variable-magnification and a good optical performance, and which is adapted to, particularly, the contrast detection type auto-focus by the blur detection of the image pickup device.

SUMMARY

Additional features and utilities of the present general inventive concept will be set forth in part in the description which follows and, in part, will be obvious from the description, or may be learned by practice of the general inventive concept.

The present inventive concept provides a vibration proof zoom lens system, which establishes a sufficient close distance while having a high variable-magnification and a good optical performance, and which is adapted to a so-called contrast detection type auto-focus by a blur detection of an image pickup device, and a photographing apparatus having the same.

Exemplary embodiments of the present general inventive concept provide a vibration proof zoom lens system which includes a first lens group with a positive refractive power, a second lens group with a negative refractive power, and a succeeding group having a positive refractive power as a whole, which are arranged in order from an object side of the system, wherein the succeeding group has a first part group with a positive refractive power, a second part group with a positive refractive power including more than one cemented lens to form at least two cemented surfaces, and a third part group with a negative refractive power, which are arranged in order from the object side, wherein in variable-magnifying from a wide angle limit to a telephoto limit, a clearance between the first lens group and the second lens group is increased and at the same time, a clearance between the second lens group and the succeeding group is decreased, wherein a focusing from an infinity side to a close side is performed by moving the first part group toward an image side of the system, wherein a vibration proof operation is performed by moving the third part group in a direction perpendicular to an optical axis to change an image position, and wherein the following condition equations (1), (2) and (3) are satisfied:

$$0.1 < f_{3a}/f_t < 0.3 \quad (1)$$

$$0.15 < f_{3b}/f_t < 0.35 \quad (2)$$

$$0.05 < |f_{3c}|/f_t < 0.25 \quad (3)$$

Here, $f_{3a}$ is a focal length of the first part group, $f_{3b}$ is a focal length of the second part group, $f_{3c}$ is a focal length of the third part group, and $f_t$ is a focal length of all systems at the telephoto limit.

In an exemplary embodiment, the succeeding group may be provided with a first part group, the second part group and a third part group, which are arranged in order from the object side to have the positive refractive power, the positive refractive power and the negative refractive power, respectively. Like this, since in addition to the first part group carrying out the focusing from the infinity side to the close side and the third part group with the negative refractive power carrying out the vibration proof, there is provided the second part group with the positive refractive power, a degree of freedom in refractive power setting is improved, as compared with a case that a positive refractive power required at the succeeding group is established only by the first part group and the third part group, and it becomes easy to restrain a change in aberration according to the focusing or a change in aberration during the vibration proof.

Further, it is possible to simplify a configuration of the first part group.

Furthermore, as the second part group is arranged between the first part group and the third part group, a degree of freedom in transverse magnification setting with the first part group and the third part group is enlarged, thereby allowing a sensitivity of focusing of the first part group and a sensitivity of the vibration proof operation of the second part group (an amount of image movement per a displacement amount to a direction perpendicular to an optical axis of the third part group) to easily control.

Moreover, as the second part group includes more than one cemented lens to have a configuration in which at least two cemented surfaces are formed, it becomes easy to restrain even a change in chromatic aberration during the vibration proof because it can better correct a chromatic aberration of object side optical system than the third part group.

Also, since the third lens group satisfies the condition equations (1), (2) and (3), it becomes easy to correct the aberration even in the high variable-magnification and a good optical performance can be obtained.

Exemplary embodiments of the present general inventive concept also provide a photographing apparatus which is configured to have the vibration proof zoom lens system as described above.

According to the photographing apparatus, it includes the same function or operation as the vibration proof zoom lens system according to an aspect of the present inventive concept described above because it has the vibration proof zoom lens system described above.

With the vibration proof zoom lens system and the photographing apparatus having the same according to the descriptions above, the succeeding group is provided with the first part group, the second part group and the third part group, which are arranged in order from the object side to have the positive refractive power, the positive refractive power and the negative refractive power, respectively. Thus, with the second part group, the degree of freedom in refractive power setting is improved and a color compensation becomes much easier. Also, the first part group can be simplified. Accordingly, the effect, which establishes the sufficient close distance while having the high variable-magnification and the good optical performance, and which is adapted to the so-called contrast detection type auto-focus by the blur detection of the image pickup device, can be obtained.

BRIEF DESCRIPTION OF THE DRAWINGS

The above and/or other features of the present inventive concept will become more apparent by describing certain exemplary embodiments of the present inventive concept with reference to the accompanying drawings, in which:

FIGS. 1A-1C are cross-sectional views showing vibration proof zoom lenses according to an exemplary embodiment when it focuses on an infinity object point at a wide angle limit, an intermediate focal length, and a telephoto limit, respectively;

FIGS. 3A-3C are cross-sectional views showing vibration proof zoom lenses according to another exemplary embodiment when it focuses on the infinity object point at the wide angle limit, the intermediate focal length, and the telephoto limit, respectively;

DETAILED DESCRIPTION

Figure 2:
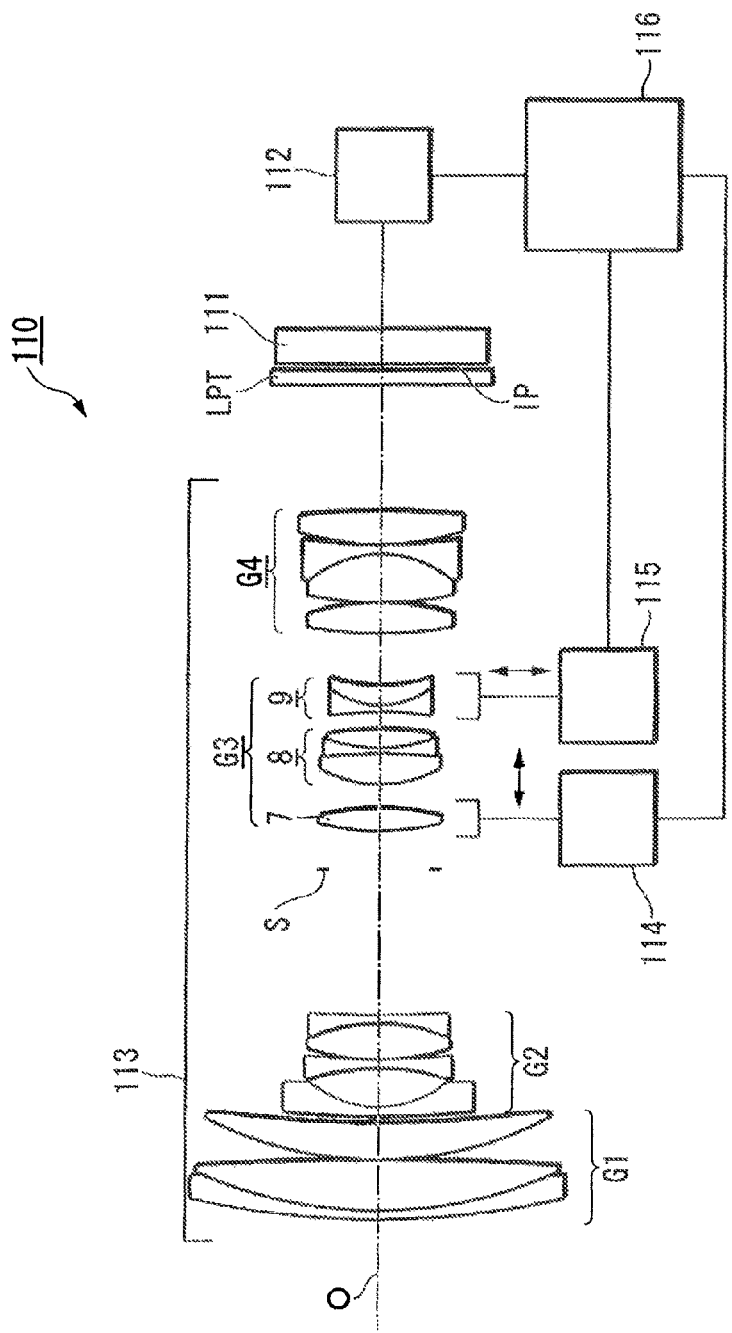
FIG. 2 is a mimetic diagram showing a construction of integral parts of a photographing apparatus having the vibration proof zoom lens according to the exemplary embodiment of FIG. 1.

Exemplary embodiments of the present inventive concept are described in greater detail below with reference to the accompanying drawings. Throughout the drawings, the same reference numerals will be understood to refer to the same or corresponding elements, features, and structures, even in different embodiments. Also, for the sake of convenient explanation, descriptions on overlapped functions or constructions will be omitted.

A vibration proof zoom lens according to an exemplary embodiment of the present inventive concept will be explained below.

Accordingly to an exemplary embodiment, FIGS. 1A-1C are cross-sectional views showing vibration proof zoom lenses when focusing on an infinity object point at a wide angle limit, an intermediate focal length, and a telephoto limit, respectively. In these drawings, a reference mark O designates an optical axis of the vibration proof zoom lens, and a reference mark IP designates an image surface (the same in below drawings). FIG. 2 is a mimetic diagram showing a construction of integral parts of a photographing apparatus having the vibration proof zoom lens according to the exemplary embodiment of FIGS. 1A-1C.

In addition, in FIGS. 1A-1C, to allow for better seeing, reference marks designating an aspherical surface and a cemented surface are included only in FIG. 1B.

As shown in FIG. 1A, the vibration proof zoom lens system 100 according to the present exemplary embodiment is a zoom optical system, which a first lens group G1, a second lens group G2, a third lens group G3, a fourth lens group G4, and an optical filter (LPF) made of a parallel plate are arranged in order from an object side of the lens system (hereinafter referred to as "object side").

An aperture S, which is moved with the third lens group G3 in a body, is provided between the second lens group G2 and the third lens group G3.

Each of the first lens group G1, the second lens group G2, the aperture S, the third lens group G3 except a third part group to be described later, and the fourth lens group G4 is disposed at a position coaxial with the optical axis O. The third part group to be described later is disposed at the position coaxial with the optical axis O except during a vibration proof operation.

The first lens group G1 in which a cemented lens 1 and a positive lens 2 made of a positive meniscus lens having a convex surface toward the object side are disposed in order from the object side is configured, so that the first lens group G1 has a positive refractive power as a whole.

The cemented lens 1 in which a negative lens 1A made of a negative meniscus lens having a convex surface toward the object side and a positive lens 1B made of a bi-convex lens are arranged and cemented in order from the object side has a positive refractive power as a whole. Between the negative lens 1A and the positive lens 1B is formed a cemented surface 1a (see FIG. 1B).

The second lens group G2 in which a negative lens 3 made of a negative meniscus lens having a convex surface toward the object side, a negative lens 4 made of a bi-concave lens, a positive lens 5 made of a bi-convex lens and a negative lens 6 made of a bi-concave lens are arranged in order from the object side is configured, so that the second lens group G2 has a negative refractive power as a whole.

Further, assuming that a focal length of all systems at a telephoto limit of the vibration proof zoom lens system 100 (here, a focal length at a wavelength of 546.1 nm and the same even in a focal length thereblow) is $f_t$, a focal length of the first lens group G1 is $f_1$ and a focal length of the second lens group G2 is $f_2$, the first and the second lens groups G1 and G2 according to the present exemplary embodiment preferably satisfy the following condition equations (6) and (7):

$$0.25 < f_1/f_t < 0.65 \tag{6}$$

$$0.04 < |f_2|/f_t < 0.1 \tag{7}$$

The condition equation (6) is a desirable condition on the focal length of the first lens group G1. If $f_1/f_t$ is less than the upper limit of 0.65, it is preferable because it becomes easier to make the entire length of optical system smaller, and if larger than the lower limit of 0.25, it is preferable because it becomes easier to correct a spherical aberration at the telephoto limit.

The condition equation (7) is a desirable condition on the focal length of the second lens group G2. If $|f_2|/f_t$ is less than the upper limit of 0.1, it is preferable because it becomes easier to establish a variable-magnifying rate, and if larger than the lower limit of 0.04, it is preferable because it becomes easier to correct a distortion aberration at the wide angle limit.

It is desirable that values of $f_1/f_t$ and $|f_2|/f_t$ are within a range as narrow as possible in the condition equations (6) and (7). For instance, $f_1/f_t$ is preferable within a range as defined by the following condition equation (6a), and $|f_2|/f_t$ is preferable within a range as defined by the following condition equation (7a).

$$0.35 < f_1/f_t < 0.55 \tag{6a}$$

$$0.055 < |f_2|/f_t < 0.085 \tag{7a}$$

The third lens group G3 in which a first part group with a positive refractive power, a second part group with a positive refractive power and a third part group with a negative refractive power are arranged in order from the object side has a positive refractive power as a whole.

The first, the second and the third part groups of the present exemplary embodiment comprise a positive lens 7, a cemented lens 8, and a cemented lens 9, respectively.

The positive lens 7 is movably supported in a direction according to the optical axis O in the third lens group G3, and carries out a focusing from an infinity side of the system 100 to a close side of the system 100 by moving toward an image side (see an arrow F in FIG. 1A).

The positive lens 7 of the present exemplary embodiment comprises a bi-convex lens and has an image side lens surface consisting of an aspherical surface 7a (see FIG. 1B) having a positive refractive power becoming smaller while moving away from an optical axis of the lens.

With the aspherical surface 7a configured as described above, it becomes easier to form the first part group in the form of one lens. In addition, as the aspherical surface 7a is configured to have the positive refractive power becoming smaller while moving away from the optical axis of lens, it becomes easier to restrain a change in spherical aberration according to the focusing, particularly, at the telephoto limit.

The cemented lens 8 of the present exemplary embodiment, in which a positive lens 8A made of a bi-convex lens, a negative lens 8B made of a negative concave lens and a positive lens 8C made of a biconvex lens are arranged and cemented in order from the object side, has a positive refractive power as a whole. Between the positive lens 8A and the negative lens 8B is formed a cemented surface 8a (see FIG. 1B) and between the negative lens 8B and the positive lens 8C is formed a cemented surface 8b (see FIG. 1B).

According to the above described setup of lens 8, the second part group of the present exemplary embodiment has a configuration having the cemented lens comprising two positive lenses 8A and 8C and one negative lens 8B.

The cemented lens 9 is supported to be movable along a direction perpendicular to the optical axis O within the third lens group G3, and performs a vibration proof operation by moving in the direction perpendicular to the optical axis O to change an image position (see an arrow c in FIG. 1A).

Here, the cemented lens 9 which moves in the direction perpendicular to the optical axis O, which means obtaining an eccentric amount in shift required in moving the image position to vibrate-proof the system, only needs to have a movement component in the direction perpendicular to the optical axis O by which the eccentric amount in shift is established. Accordingly, for instance, even if the movement deviates from the direction exactly perpendicular to the optical axis O due to tolerances in manufacturing or assembling parts, it should be appreciated to be within a scope of the inventive concept.

The cemented lens 9 of the present exemplary embodiment comprises a cemented lens in which a negative lens 9A made of a bi-concave lens having an object side concave surface consisting of an aspherical surface 9a (see FIG. 1B) and a positive lens 9B made of a positive meniscus lens having a convex surface toward the object side are arranged and cemented in order from the object side, and has a negative refractive power as a whole.

The aspherical surface 9a the present exemplary embodiment is configured to have a negative refractive power becoming smaller while moving away from an optical axis of lens. As the most object side lens surface is of such an aspherical surface, it becomes easier to correct a coma-aberration in the vibration proof.

Between the negative lens 9A and the positive lens 9B is formed a cemented surface 9b (see FIG. 1B).

According to the above described setup of lens 9, the third part group has a configuration having the cemented lens comprising one negative lens 9A and one positive lens 9B.

Further, assuming that a focal length of the first part group (the positive lens 7) is $f_{3a}$, a focal length of the second part group (the cemented lens 8) is $f_{3b}$, and a focal length of the third part group (the cemented lens 9) is $f_{3c}$, the third lens group G3 of the present exemplary embodiment satisfies the following condition equations (1), (2) and (3):

$$0.1 < f_{3a}/f_t < 0.3 \tag{1}$$

$$0.15 < f_{3b}/f_t < 0.35 \tag{2}$$

$$0.05 < |f_{3c}|/f_t < 0.25 \tag{3}$$

The condition equation (1) is a condition on the focal length of the first part group. If $f_{3a}/f_t$ is larger than the upper limit of 0.3, an amount of focus movement of the first part group at the telephoto limit becomes too large, and if less than the lower limit of 0.1, it becomes difficult to restrain a change in spherical aberration according to the focusing at the telephoto limit.

The condition equation (2) is a condition on the focal length of the second part group. If $f_{3b}/f_t$ is larger than the upper limit of 0.35, it becomes difficult to maintain a variable-magnifying rate, and if exceeds the lower limit of 0.15, it becomes difficult to correct a spherical aberration at the telephoto limit.

The condition equation (3) is a condition on the focal length of the third part group. If $|f_{3c}|/f_t$ is larger than the upper limit of 0.25, a displacement amount of the third part group in the vibration proof at the telephoto limit becomes too large, and if less than the lower limit of 0.05, it becomes difficult to correct a change in coma-aberration in the vibration proof at the telephoto limit.

It is desirable that values of $f_{3a}/f_t$, $f_{3b}/f_t$ and $|f_{3c}|/f_t$ are within a range as narrow as possible in the condition equations (1), (2) and (3). For instance, $f_{3a}/f_t$ is preferable within a range as defined by the following condition equation (1a), $f_{3b}/f_t$ is preferable within a range as defined by the following condition equation (2a) and $|f_{3c}|/f_t$ is preferable within a range as defined by the following condition equation (3a).

$$0.14 < f_{3a}/f_t < 0.23 \tag{1a}$$

$$0.20 < f_{3b}/f_t < 0.30 \tag{2a}$$

$$0.10 < |f_3|/f_t < 0.20 \tag{3a}$$

The fourth lens group G4 of FIG. 1 in which a positive lens 10 made of a bi-convex lens having an aspherical surface 10a toward the image, a cemented lens 11, and a positive lens 12 made of a bi-convex lens are arranged in order from the object side has a positive refractive power as a whole.

The aspherical surface 10a is of an aspherical surface having a positive refractive power becoming smaller while moving away from an optical axis of the lens.

The cemented lens 11 in which a positive lens 11A made of a bi-convex lens and a negative lens 11B made of a negative concave lens are arranged and cemented in order from the object side has a negative refractive power as a whole. Between the positive lens 11A and the negative lens 11B is formed a cemented surface 11a (see FIG. 1B).

In this case, the third lens group G3 and the fourth lend group G4 form a succeeding group to the first lens group G1 and the second lens group G2 in the vibration proof zoom lens 100, and have a positive refractive power as a whole.

Assuming that a focal length of the third lens group G3 at the telephoto limit is $f_{Ra}$ and a focal length of the fourth lens group G4 is $f_{Rb}$, the succeeding group of the first exemplary embodiment preferably satisfy the following condition equations (4) and (5):

$$0.05 < f_{Ra}/f_t < 0.3 \tag{4}$$

$$0.1 < f_{Rb}/f_t < 0.35 \tag{5}$$

The condition equation (4) is a desirable condition on a focal length of an object side lens group (front lens group) including the first part group, the second part group and the third part group among the succeeding group. If $f_{Ra}/f_t$ is less than the upper limit of 0.3, it is preferable because it becomes easier to make the entire size of optical system smaller, and if larger than the lower limit of 0.05, it is preferable because it becomes easier to correct a spherical aberration, particularly, at the telephoto limit.

The condition equation (5) is a desirable condition on a focal length of a lens group further toward the image (rear lens group) than the front lens group. If $f_{Rb}/f_t$ is less than the upper limit of 0.35, it is preferable because it becomes easier to establish the variable-magnifying rate, and if larger than the lower limit of 0.1, it is preferable because it becomes easier to correct the distortion aberration, particularly, at the wide angle limit.

It is desirable that values of $f_{Ra}/f_t$ and $f_{Rb}/f_t$ are within a range as narrow as possible in the condition equations (4) and (5). For instance, $f_{Ra}/f_t$ is preferable within a range as defined by the following condition equation (4a), and $f_{Rb}/f_t$ is preferable within a range as defined by the following condition equation (5a), $$0.12 < f_{Ra}/f_t < 0.22 \tag{4a}$$

$$0.17 < f_{Rb}/f_t < 0.29 \tag{5a}$$

Next, an operation of the vibration proof zoom lens system 100 according to the present exemplary embodiment will be explained.

As shown in FIGS. 1A-1C, the vibration proof zoom lens 100 is operated, so that when at the time of focusing on an infinity object point, variable-magnifying from the wide angle limit (see FIG. 1A) to the telephoto limit (see FIG. 1C) via the intermediate focal length (see FIG. 1B), all of the first lens group G1, the second lens group G2, the aperture S, the third lens group G3 and the fourth lens group G4 moves along the optical axis O toward the object side.

At this time, a clearance between the first lens group G1 and the second lens group G2 is increased and a clearance between the second lens group G2 and the succeeding group G3 is decreased.

Further, in the third lens group G3, a clearance between the first part group (the positive lens 7) and the second part group (the cemented lens 8) is increased.

A focusing from an infinity side to a close side can be performed by moving the first part group (the positive lens 7) of the third lens group G3 along the optical axis O toward the image side (see arrow F).

Since in the variable-magnifying from the wide angle limit to the telephoto limit, a clearance between the first part group and the second part group is increased as described above, it becomes easy for the entire optical system to arrange a refractive power of retro focus at the wide angle, thereby facilitating the wide angle. In addition, at the telephoto limit, it becomes easy to establish a moving space when the first part group moves for focusing.

Also, when the vibration proof zoom lens 100 is vibrated by, for example, hand tremors and the like, the vibration proof feature can be performed by moving the third part group (the cemented lens 9) of the third lend group G3 in the direction perpendicular to the optical axis O to move the position of an image in a opposite direction to a direction in which image vibrations occur.

As described above, according to the vibration proof zoom lens 100 of the present exemplary embodiment, the first lens group G1 with the positive refractive power, the second lens group G2 with the negative refractive power and the succeeding group having the positive refractive power as a whole are arranged in order from the object side, and thus the focusing from the telephoto side to the close side and the vibration proof operation can be performed by the succeeding group.

The succeeding group is provided with the first part group, the second part group and the third part group disposed in order from the object side to have the positive refractive power, the positive refractive power and the negative refractive power, respectively. Since in addition to the first part group carrying out the focusing from the infinity side to the close side and the third part group with the negative refractive power carrying out the vibration proof, there is provided the second part group (the cemented lens 8) with the positive refractive power, a degree of freedom in refractive power setting can be improved, as compared with a case that the positive refractive power required at the succeeding group is established only by the first part group and the third part group.

On this account, restraining the change in aberration according to the focusing or the change in aberration during the vibration proof performance and the optical performance can be improved.

Further, it is possible to simplify the configuration of the first part group. In the present exemplary embodiment, since the first part group comprises one positive lens 7, the lens can be reduced in weight and at the same time, a lens body tube for focusing is also simplified.

Accordingly, the vibration proof zoom lens 100 can be adapted to the contrast detection type auto focus by the blur detection of the image pickup device, which requires controlling, particularly, very small forward and rearward movements.

Furthermore, as the second part group is disposed between the first part group and the third part group, a degree of freedom in transverse magnification setting with the first part group and the third part group is enlarged, thereby allowing a sensitivity of focusing of the first part group and a sensitivity of vibration proof of the third part group to easily control.

Moreover, as the second part group has the cemented lens 8 in which two cemented surfaces 8a and 8b are formed, it becomes easy to correct a change in chromatic aberration during the vibration proof performance because it can better correct a chromatic aberration of object side optical system than the third part group.

Also, since the third lens group satisfies the condition equations (1), (2) and (3), it becomes easy to correct the aberration even in the high variable-magnification and a good optical performance can be obtained.

According to the construction of the present exemplary embodiment, as illustrated in a first example to be described later, it is possible to form a zoom lens with a vibration proof function, which can be focused on, for example, a close object distance of 0.5 m from an infinity object distance, and which has a focal length of wide angle limit of 18.5 mm and a focal length of telephoto limit of 194.15 mm.

Next, an example of a photographing apparatus having the vibration proof zoom lens 100 will be explained.

The photographing apparatus 110 is, for example, an interchangeable lens camera in which an auto focus is performed in a contrast detection method by a blur detection of an image pickup device.

As shown in FIG. 2, the photographing apparatus 110 has a zoom body tube 113 in which the vibration proof zoom lens 100 of the present exemplary embodiment is disposed to allow for the variable-magnification operation, the focusing operation and the vibration proof operation, and is detachably mounted to a main body of the apparatus, which is not shown in the drawing.

In the zoom body tube 113 is provided a focusing actuator 114, which has the positive lens 7 to be movable in a direction of the optical axis O within the third lens group G3 during the focusing operation, and a vibration proof actuator 115, which has the cemented lens 9 to be relatively movable in a direction perpendicular to the optical axis O within the third lens group G3 during the vibration proof performance, based on an sensing output of a vibration detection sensor, which is not shown in the drawing.

When the zoom body tube 113 is mounted to the main body of the apparatus, the focusing actuator 114 and the vibration proof actuator 115 are electrically connected with a control unit 116 in the main body of the apparatus.

In the main body of the apparatus is provided an image pickup device 111 made up of a charge coupled device (CCD), a complementary metal-oxide semiconductor (CMOS) device or the like, having an image pickup surface on a surface (IP) toward an image, an image processing unit 112 to signal-process an image signal from the image pickup device 111 and thus to perform an auto focus sensing by the contrast detection method, and the control unit 116 electrically connected with the image processing unit 112 and electrically connected with the focusing actuator 114 and the vibration proof actuator 115 when the zoom body tube 113 is mounted to the main body of the apparatus, to perform the auto focusing operation by the contrast detection method and the vibration proof operation.

According to the photographing apparatus 110 constructed as described above, it includes the same function or operation as the vibration proof zoom lens 100 because it has the vibration proof zoom lens 100. In particular, as the photographing apparatus 110 can easily perform the auto focus by the contrast detection method with the vibration proof zoom lens 100, it can be formed compactly.

A vibration proof zoom lens according to another exemplary embodiment will be described below.

In FIGS. 3A-3C are cross-sectional views showing vibration proof zoom lenses according to another exemplary embodiment when focusing on an infinity object point at a wide angle limit, an intermediate focal length, and a telephoto limit, respectively.

In addition, in FIGS. 3A-3C, to allow for better seeing, reference marks designating an aspherical surface and a cemented surface are included only in FIG. 3B.

As shown in FIG. 3A, the vibration proof zoom lens 101 according to the present exemplary embodiment is provided with a first lens group G11, a second lens group G12, and a fourth lens group G14, which have the same configurations as the first lens group G1, the second lens group G2, and the fourth lens group G4 of the vibration proof zoom lens 100 of the previous exemplary embodiment, respectively.

Further, the vibration proof zoom lens 101 is provided with a third lens group G13, instead of the third lens group G3 of the vibration proof zoom lens 100.

In addition to a first part group, a second part group and a third part group, which have the same configurations as those of the third lens group G3 of the previous exemplary embodiment, the third lens group G13 further includes a negative lens 30 as a fourth part group having a negative refractive power, which is disposed between an aperture S on an object side of the first part group and the second lens group G12, and has a positive refractive power as a whole. The fourth part group is of a subsidiary part group to adjust an arrangement of refractive power in the third lens group G13.

The third lens group G13 and the fourth lens group G14 form a succeeding group, which has a positive refractive power as a whole, to the first lens group G11 and the second lens group G12.

Hereinafter, the vibration proof zoom lens 101 will be explained with priority given to different points from the vibration proof zoom lens 100 of the previous exemplary embodiment.

The first lens group G11 of the present exemplary embodiment is made up of a cemented lens 21 consisting of a negative lens 21A and a positive lens 216, and a positive lens 22, which correspond to and have the same configuration as the cemented lens 1 made of the negative lens 1A and the positive lens 1B and the positive lens 2 of the first lens group G1 of the first exemplary embodiment. The cemented lens 21 has a cemented surface 21a (see FIG. 33), which corresponds to the cemented surface 1a of the cemented lens 1.

The second lens group G12 of the present exemplary embodiment is made up of a negative lens 23, a negative lens 24, a positive lens 25, and a negative lens 26, which correspond to and have the same configuration as the negative lens 3, the negative lens 4, the positive lens 5 and the negative lens 6 of the second lens group G2 of the previous exemplary embodiment.

The negative lens 30 of the third lens group G13 of the present exemplary embodiment comprises a negative meniscus lens having a concave surface toward an object side.

Assuming that a focal length of the fourth part group is $f_{3f}$, the negative lens 30 preferably satisfies the following condition equation (8):

$$0.5 < |f_{3f}|/f_t < 5.0 \quad (8)$$

The condition equation (8) is a desirable condition on the focal length of the fourth part group. If $|f_{3f}|/f_t$ is less than the upper limit of 5.0, it is preferable because it becomes easier to make a focus sensitivity at a telephoto limit larger and at the same time, to make an amount of focus movement of the positive lens 27 smaller and if larger than the lower limit of 0.5, it is preferable because it becomes easier to correct a coma aberration at a wide angle limit.

It is desirable that a value of $|f_{3f}|/f_t$ is within a range as narrow as possible in the condition equation (8). For instance, $|f_{3f}|/f_t$ is preferable within a range as defined by the following condition equation (8a):

$$1.0 < |f_{3f}|/f_t < 2.0 \quad (8a)$$

In addition, the third lens group G 13 of the present exemplary embodiment is made up of a positive lens 27 (first part group), a cemented lens 28 (second part group) consisting of a positive lens 28A, a negative lens 28B and a positive lens 28C, and a cemented lens 29 (third part group) consisting of a negative lens 29A and a positive lens 29B, which correspond to and have the same configurations as the positive lens 7, the cemented lens 8 consisting of the positive lens 8A, the negative lens 8B and the positive lens 8C, and the cemented lens 9 consisting of the negative lens 9A and the positive lens 9B of the third lens group G3 of the previous exemplary embodiment.

An image side lens surface of the positive lens 27 is composed of an aspherical surface 27a (see FIG. 3B) having a positive refractive power becoming smaller while moving away from an optical axis of the lens, which corresponds to the aspherical surface 7a of the positive lens 7.

The cemented lens 28 is provided with cemented surfaces 28a and 28b (see FIG. 3B), which corresponds to the cemented surfaces 8a and 8b of the cemented lens 8.

A most object side lens surface of the cemented lens 29 comprises an aspherical surface 29a (see FIG. 3B) having a negative refractive power becoming smaller while moving away from the optical axis of lens, which corresponds to the aspherical surface 9a of the positive lens 9. In addition, the cemented lens 29 is provided with a cemented surface 29b (see FIG. 3B), which corresponds to the cemented surface 9b of the cemented lens 9 of FIG. 1.

The fourth lens group G14 of the present exemplary embodiment comprises a positive lens 31, a cemented lens 32 consisting of a positive lens 32A and a negative lens 32B, and a positive lens 33, which correspond to and have the same configurations as the positive lens 10, the cemented lens 11 consisting of the positive lens 11A and the negative lens 11B, and the positive lens 12 of the fourth lens group G4 of the previous exemplary embodiment.

An image side lens surface of the positive lens 31 comprises an aspherical surface 31a (see (b) Of FIG. 3) having a positive refractive power becoming smaller while moving away from the optical axis of lens, which corresponds to the aspherical surface 10a of the positive lens 10.

The cemented lens 32 is provided with a cemented surface 32a (see FIG. 3B), which corresponds to the cemented surface 11a of the cemented lens 11.

Further, like the first and the second lens groups G1 and G2 of the previous exemplary embodiment, the first and the second lens groups G11 and G12 of the present exemplary embodiment preferably satisfy the condition equations (6) and (7), more particularly, (6a) and (7a), as described above.

Furthermore, like the third lens groups G3 of the previous exemplary embodiment, the third lens groups G13 of the present exemplary embodiment satisfies the condition equations (1), (2) and (3) as described above.

In particular, the third lens groups G13 preferably satisfies the condition equations (1a), (2a) and (3a) as described above.

Also, like the succeeding group of the previous exemplary embodiment, the succeeding group of the present exemplary embodiment preferably satisfies the condition equations (4) and (5), more particularly, (4a) and (5a), as described above.

Next, an operation of the vibration proof zoom lens 101 of the present exemplary embodiment will be explained.

As shown in FIGS. 3A-3C, like the vibration proof zoom lens system 100 of the previous exemplary embodiment, the vibration proof zoom lens system 101 is operated, so that when at the time of focusing on an infinity object point, variable-magnifying from a wide angle limit (see FIG. 3A) to a telephoto limit (see FIG. 3C) via an intermediate focal length (see FIG. 3B), all of the first lens group G11, the second lens group G12, the aperture S, the third lens group G13 and the fourth lens group G14 move along the optical axis O toward the object side. At this time, a clearance between the first lens group G11 and the second lens group G12 is increased and a clearance between the second lens group G12 and the succeeding group G13 is decreased.

Further, in the third lens group G13, a clearance between the first part group (the positive lens 27) and the second part group (the cemented lens 28) is increased. Also, a clearance between the fourth part group (the negative lens 30) and the first part group is decreased.

Like the vibration proof zoom lens 100 of the previous exemplary embodiment, a focusing from an infinity side to a close side can be performed by moving the first part group (the positive lens 27) of the third lens group G13 along the optical axis O toward an image side.

Also, when the vibration proof zoom lens 101 is vibrated by, for example, hand tremors and the like, the vibration proof operation can be performed by moving the third part group (the cemented lens 29) of the third lend group G13 in a direction perpendicular to the optical axis O to move a position of the image in an opposite direction to a direction in which image vibrations occur.

As described above, since the vibration proof zoom lens system 101 has the same configuration as the vibration proof zoom lens 100 of the previous exemplary embodiment, it includes the same function or operation as the vibration proof zoom lens system 100.

Further, according to the vibration proof zoom lens system 101, since the succeeding group further includes the fourth part group (the negative lens 30) with the negative refractive power toward the image side of the first part group, a degree of freedom in refractive power setting of the third lens group G13 is more increased. Thus, it becomes easier to control a focusing sensitivity of the first part group and a vibration proof sensitivity of the third part group. On this account, it is possible to improve a correction of a change in aberration according to the focusing operation or a change in aberration during the vibration proof operation, and an optical performance can also be improved.

Also, since the vibration proof zoom lens system 101 is adapted to the contrast detection type auto focus, it is possible for the photographing apparatus 110 of FIG. 2 to employ this vibration proof zoom lens system 101 as an alternative to the vibration proof zoom lens system 100.

A vibration proof zoom lens system according to yet another exemplary embodiment will be described below.

Figure 4:
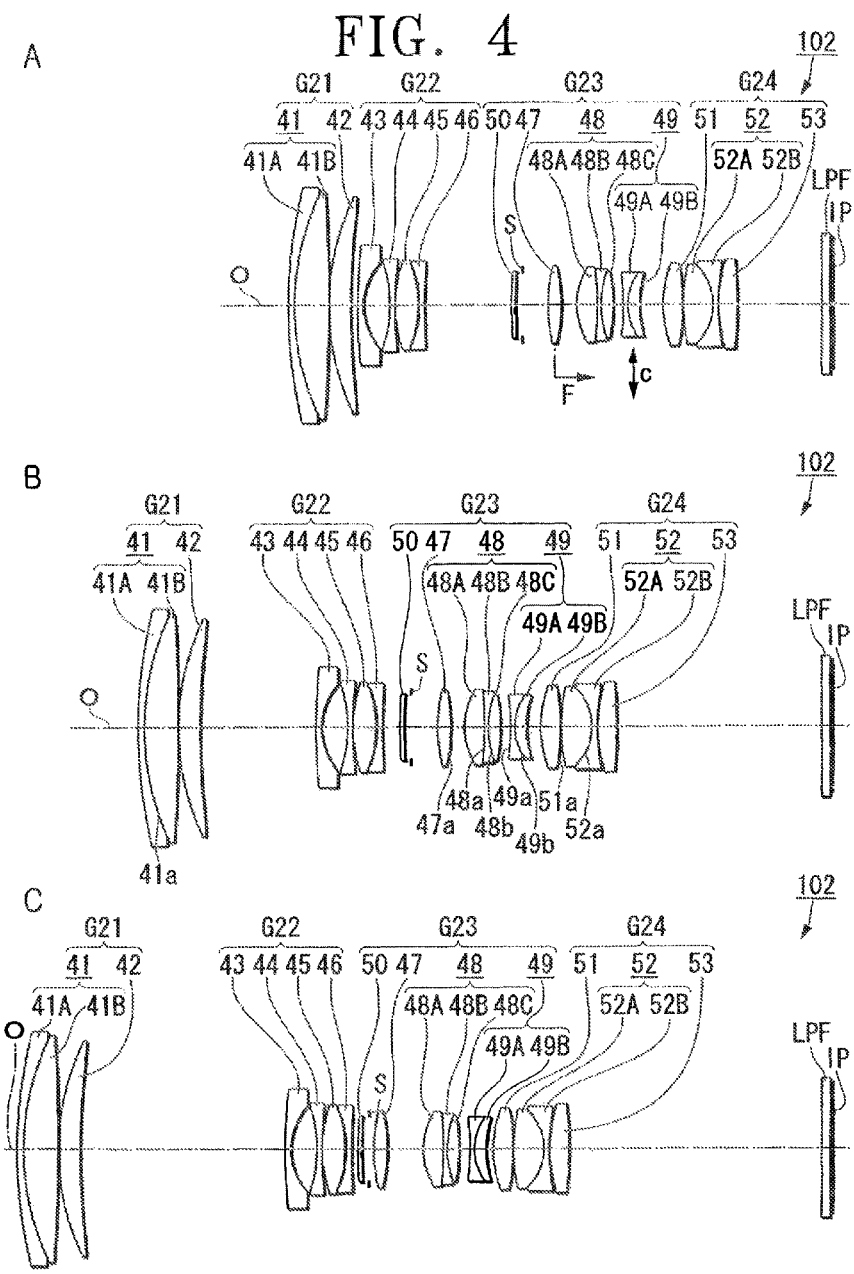
FIGS. 4A-4C is cross-sectional views showing vibration proof zoom lenses according to yet another exemplary embodiment when it focuses on the infinity object point at the wide angle limit, the intermediate focal length, and the telephoto limit, respectively.
Figure 5:
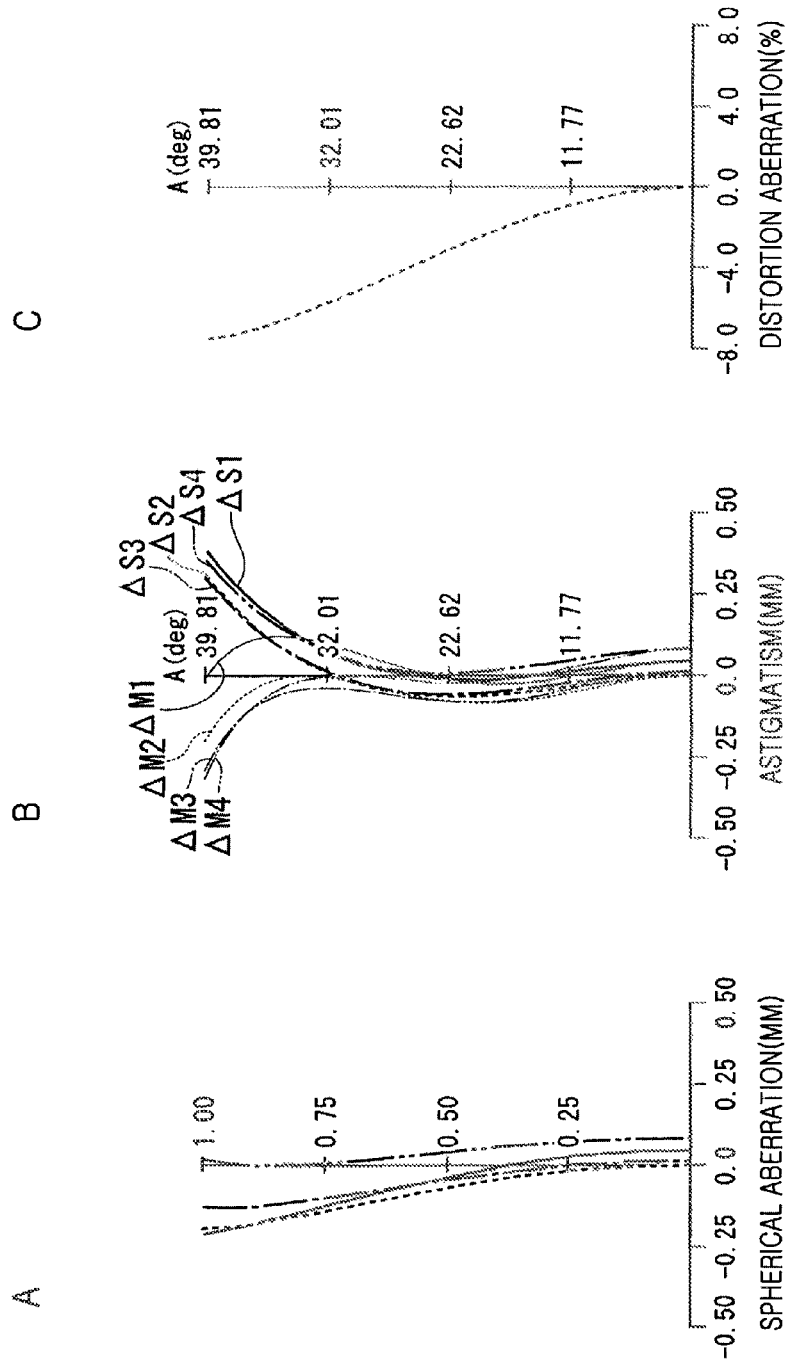
FIGS. 5A-5C are aberration views showing a spherical aberration, an astigmatism, and a distortion aberration of the vibration proof zoom lens according to the exemplary embodiment illustrated in FIG. 1 when it focuses on an infinity object distance at the wide angle limit, respectively.
Figure 6:
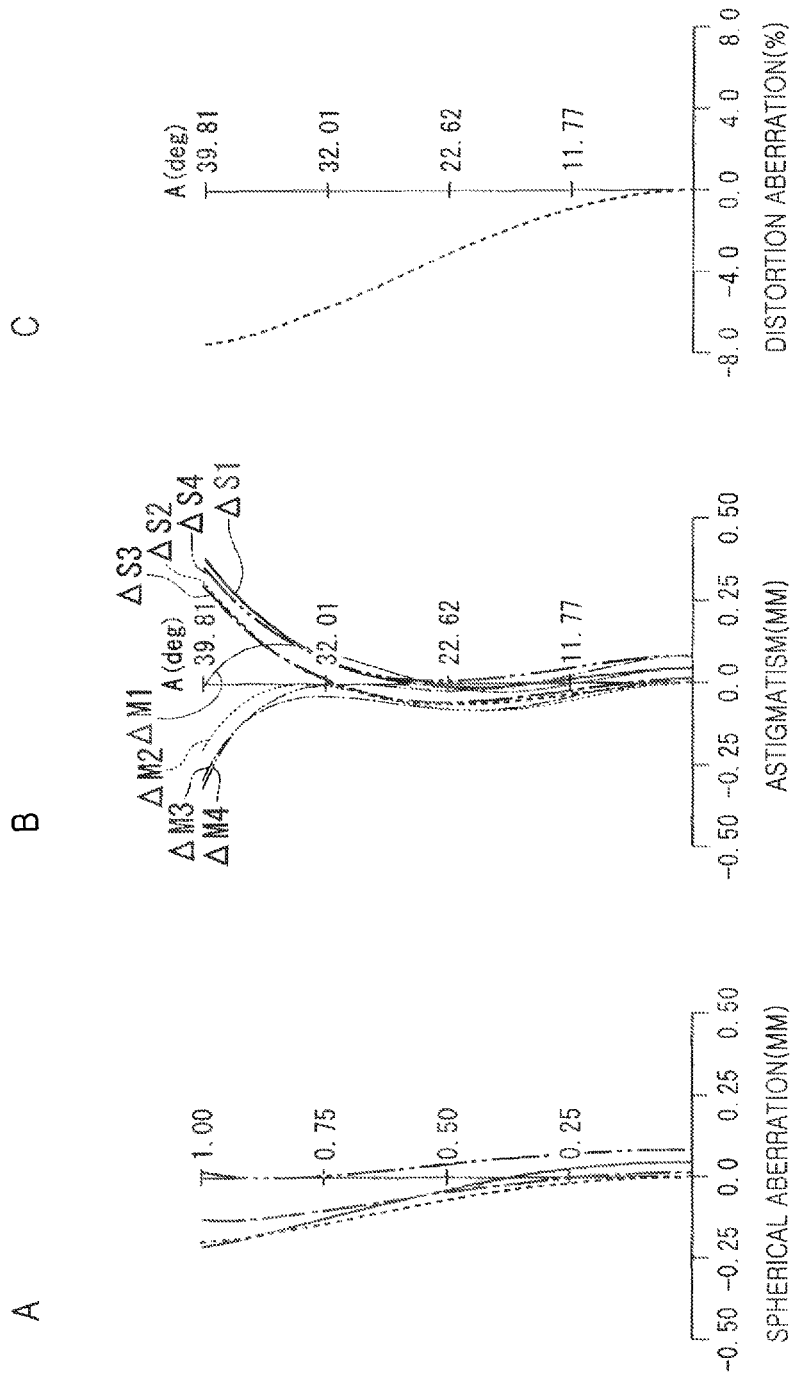
FIGS. 6A-6C are aberration views showing a spherical aberration, an astigmatism, and a distortion aberration of the vibration proof zoom lens according to the exemplary embodiment of FIG. 1 when it focuses on an object distance of 0.5 m at the wide angle limit, respectively.

FIGS. 4A-4C are cross-sectional views showing vibration proof zoom lenses according to yet another exemplary embodiment when focusing on an infinity object point at a wide angle limit, an intermediate focal length, and a telephoto limit, respectively.

In addition, in FIGS. 4A-4C, to allow for better view of FIGS. 4A-4C, reference marks designating an aspherical surface and a cemented surface are included only in FIG. 4B.

As shown in FIG. 4A, the vibration proof zoom lens system 102 according to the present exemplary embodiment is provided with a first lens group G21, a second lens group G22, and a fourth lens group G24, which have the same configurations as the first lens group G11, the second lens group G12, and the fourth lens group G14 of the vibration proof zoom lens 101 of the previous exemplary embodiment, respectively.

Further, instead of the third lens group G13 of the vibration proof zoom lens 101, the vibration proof zoom lens 102 is provided with a third lens group G23 in which first to third part groups except a fourth part group have the same configurations as those of the third lens group G13.

Hereinafter, the vibration proof zoom lens 102 will be explained with priority given to different points from the vibration proof zoom lens 101 of the previous exemplary embodiment.

The first lens group G21 of the present exemplary embodiment comprises a cemented lens 41 including a negative lens 41A and a positive lens 41B, and a positive lens 42, which correspond to and have the same configuration as the cemented lens 21 consisting of the negative lens 21A and the positive lens 21B and the positive lens 22 of the first lens group G12 of the previous exemplary embodiment. The cemented lens 41 has a cemented surface 41a (see FIG. 46), which corresponds the cemented surface 21a of the cemented lens 21.

The second lens group G22 of the present exemplary embodiment is made up of a negative lens 43, a negative lens 44, a positive lens 45, and a negative lens 46, which correspond to and have the same configuration as the negative lens 23, the negative lens 24, the positive lens 25 and the negative lens 26 of the second lens group G12 of the previous exemplary embodiment.

The third lens group G23 of the present exemplary embodiment is provided with a negative lens 50 consisting of a negative meniscus lens having a convex surface toward an object side, instead of the negative lens 30 of the previous exemplary embodiment, as a fourth part group with a negative refractive power.

The negative lens 50 preferably satisfies the condition equation (8), more particularly, (8a), as described above.

Also, the third lens group G23 of the present exemplary embodiment includes a positive lens 47 (first part group), a cemented lens 48 (second part group) consisting of a positive lens 48A, a negative lens 48B and a positive lens 48C, and a cemented lens 49 (third part group) consisting of a negative lens 49A and a positive lens 49B, which correspond to and have the same configurations as the positive lens 27, the cemented lens 28 consisting of the positive lens 28A, the negative lens 28B and the positive lens 28C, and the cemented lens 29 consisting of the negative lens 29A and the positive lens 29B of the third lens group G13 of the previous exemplary embodiment.

An image side lens surface of the positive lens 47 comprises an aspherical surface 47a (see FIG. 4B) having a positive refractive power becoming smaller while moving away from an optical axis of the lens, which corresponds to the aspherical surface 27a of the positive lens 27. In addition, the cemented lens 49 is provided with a cemented surface 49b (see FIG. 4B), which corresponds to the cemented surface 9b of the cemented lens 9.

The cemented lens 48 is provided with cemented surfaces 48a and 48b (see FIG. 4B), which corresponds to the cemented surfaces 28a and 28b of the cemented lens 28.

A most object side lens surface of the cemented lens 49 comprises an aspherical surface 49a (see FIG. 4B) having a negative refractive power becoming smaller while moving away from the optical axis of the lens, which corresponds to the aspherical surface 29a of the positive lens 29.

The fourth lens group G24 of the present exemplary embodiment comprises a positive lens 51, a cemented lens 52 consisting of a positive lens 52A and a negative lens 52B, and a positive lens 53, which correspond to and have the same configurations as the positive lens 31, the cemented lens 32 consisting of the positive lens 32A and the negative lens 32B, and the positive lens 33 of the fourth lens group G14 of the previous exemplary embodiment.

An image side lens surface of the positive lens 51 comprises an aspherical surface 51a (see FIG. 4B) having a positive refractive power becoming smaller while moving away from the optical axis of lens, which corresponds to the aspherical surface 31a of the positive lens 31.

The cemented lens 52 is provided with a cemented surface 52a (see FIG. 4B), which corresponds to the cemented surface 32a of the cemented lens 32.

Further, like the first and the second lens groups G11 and G12 of the previous exemplary embodiment, the first and the second lens groups G21 and G22 of the present exemplary embodiment preferably satisfy the condition equations (6) and (7), more particularly, (6a) and (7a), as described above.

Furthermore, like the third lens groups G13 of the previous exemplary embodiment, the third lens groups G23 of the present exemplary embodiment satisfies the condition equations (1), (2) and (3) as described above.

In particular, the third lens groups G23 preferably satisfies the condition equations (1a), (2a) and (3a) as described above.

Also, like the succeeding group of the previous exemplary embodiment, the succeeding group of the present exemplary embodiment preferably satisfies the condition equations (4) and (5), more particularly, (4a) and (5a), as described above.

Next, an operation of the vibration proof zoom lens 102 of the present exemplary embodiment will be explained.

With the configuration as described above, the vibration proof zoom lens system 102 has the same configuration as the vibration proof zoom lens 101 of the previous exemplary embodiment, except that the negative lens 50 of the fourth lens group is the negative meniscus lens with the convex surface toward the object side. In this case, the vibration proof zoom lens system 102 includes the same functions or operations as the vibration proof zoom lens system 101 of FIG. 3A-3C.

Also, since the vibration proof zoom lens system 102 is adapted to the contrast detection type auto focus, it is possible for the photographing apparatus 110 of FIG. 2 to employ this lens system 102 as an alternative to the vibration proof zoom lens system 100.

In the foregoing description, although the first part group of the third lens group has been explained as comprising one positive lens with the aspherical surface toward the image side, this is only an example. If the first part group is a part group with a positive refractive power and is configured to be simplified or weight-lightened thus to facilitate a very small displacement, it does not need to have the aspherical surface. In addition, even in the number of the lenses, the first part group can be configured to have, for example, more than two sheets.

Further, in the foregoing description, although the second part group of the third lens group has been explained as having the cemented lens comprising three lenses to form two cemented surfaces, it can be configured to have more than two cemented surfaces in order to correct the chromatic aberration well. For this, the second part group can have more than three lenses. For instance, the second part group can have two pairs of cemented lens, each of which comprise two cemented lenses, to form two cemented surfaces.

Furthermore, in the foregoing description, although the photographing apparatus using the vibration proof zoom lenses of the above described exemplary embodiments of the present inventive concept has been explained as the interchangeable lens camera, this is only an example, and the present inventive concept is not limited thereto. For instance, the photographing apparatus can be a built-in lens type camera, or a photographing apparatus, such as a video camera or the like.

Moreover, in the foregoing description, the number of the lenses or the arrangement and shape of the lens surfaces to form the positive and the negative refractive powers in each of the lens groups and the part groups is explained by way of showing examples only, and the present inventive concept is not limited thereto. In addition to the lens configurations of the exemplary embodiments as described above, it is possible to add proper lenses to each of the lens groups and the part groups if it is within the scope of technical spirit of the present inventive concept.

Also, all components explained in the exemplary embodiments of the present inventive concept can be embodied properly changing combinations or being properly deleting therefrom within the scope of technical spirit of the present inventive concept. For instance, aspects, desirable or preferable aspects and more preferable aspects embodied in the exemplary embodiments as described above can be embodied properly combining with each other.

EXAMPLE

Example 1

Next, an example 1, which is an example of a numerical value of the vibration proof zoom lens system 100 illustrated in the exemplary embodiment of FIGS. 1A-1C as described above will be explained.

The below table shows configuration parameters of the vibration proof zoom lens system 100 of the example 1. A surface number j (j is a natural number) is distributed to each of surfaces of lenses forming the vibration proof zoom lens system 100, respectively, so that the surface is increased toward the image side from a most object side lens surface to which a number 1 is assigned among surface of lenses forming the vibration proof zoom lens system 100.

Further, a radius of curvature $R_j$ is a radius of curvature of the lens surface corresponding to the surface number j, a surface clearance $D_j$ is a surface clearance on an axis between a lens surface of the surface number j and a lens surface of the surface number j+1, and units are mm. For instance, the cemented surface 1a is a surface number 2, and the aspherical surface 7a is a surface number 16.

Also, refractive indexes $\eta_d$ and $\upsilon_d$ represent a refractive index and an Abbe's number at a d line (wavelength of 587.56 nm) of each lens.

A shape of the aspherical surface, as a Sag's amount (a displacement amount in a direction of optical axis) x of a surface parallel to the optical axis O when an apex of the surface is of an origin and h is of a height from the optical axis O, is represented by the following formula 1.

[Formula 1]

$$x = \frac{Ch^2}{1 + \sqrt{1-(1+K)C^2h^2}} + \sum_{i=2}^{5} A_{2i}h^{2i} \quad (a)$$

$$C = \frac{1}{R} \quad (b)$$

Here, C is represented by (b) of the above formula 1 when a curvature at an apex surface, that is, a radius of curvature on radical axis is of R. Further, K is a conic constant and $A_{2i}$ (i=1, ..., 5) are fourth, sixth, eighth, and tenth asphericities, respectively.

| Surface number | Radius of curvature(R) | Surface clearance(D) | refractive index($\eta_d$) | Abbe's number($v_d$) |
|---|---|---|---|---|
| 1 | $R_1$ = 111.479 | $D_1$ = 1.50 | $\eta_1$ = 1.80518 | $v_1$ = 25.5 |
| 2 | $R_2$ = 61.309 | $D_2$ = 7.60 | $\eta_2$ = 1.49700 | $v_2$ = 81.6 |
| 3 | $R_3$ = −426.398 | $D_3$ = 0.15 | | |
| 4 | $R_4$ = 52.448 | $D_4$ = 5.54 | $\eta_3$ = 1.62041 | $v_3$ = 60.3 |
| 5 | $R_5$ = 182.297 | $D_5$ (Variable) | | |
| 6 | $R_6$ = 141.166 | $D_6$ = 1.30 | $\eta_4$ = 1.83481 | $v_4$ = 42.7 |
| 7 | $R_7$ = 14.181 | $D_7$ = 5.96 | | |
| 8 | $R_8$ = −29.683 | $D_8$ = 1.10 | $\eta_5$ = 1.83481 | $v_5$ = 42.7 |
| 9 | $R_9$ = 76.302 | $D_9$ = 0.21 | | |
| 10 | $R_{10}$ = 33.315 | $D_{10}$ = 5.38 | $\eta_6$ = 1.84666 | $v_6$ = 23.8 |

-continued

| 11 | $R_{11} = -24.432$ | $D_{11} = 0.19$ | | |
| 12 | $R_{12} = -22.408$ | $D_{12} = 1.00$ | $\eta_7 = 1.80420$ | $\nu_7 = 46.5$ |
| 13 | $R_{13} = 214.014$ | $D_{13}$ (Variable) | | |
| 14 | $R_{14} =$ (Aperture) | $D_{14}$ (Variable) | | |
| 15 | $R_{15} = 37.571$ | $D_{15} = 3.34$ | $\eta_8 = 1.58673$ | $\nu_8 = 61.3$ |
| 16 | $R_{16}$ (Aspherical surface) | $D_{16}$ (Variable) | | |
| 17 | $R_{17} = 18.038$ | $D_{17} = 4.52$ | $\eta_9 = 1.49700$ | $\nu_9 = 81.6$ |
| 18 | $R_{18} = -94.304$ | $D_{18} = 0.90$ | $\eta_{10} = 1.84666$ | $\nu_{10} = 23.8$ |
| 19 | $R_{19} = 25.723$ | $D_{19} = 2.77$ | $\eta_{11} = 1.51742$ | $\nu_{11} = 52.2$ |
| 20 | $R_{20} = -60.178$ | $D_{20} = 2.50$ | | |
| 21 | $R_{21}$ (Aspherical surface) | $D_{21} = 1.20$ | $\eta_{12} = 1.69090$ | $\nu_{12} = 53.3$ |
| 22 | $R_{22} = 11.448$ | $D_{22} = 2.88$ | $\eta_{13} = 1.72825$ | $\nu_{13} = 28.3$ |
| 23 | $R_{23} = 23.631$ | $D_{23}$ (Variable) | | |
| 24 | $R_{24} = 57.717$ | $D_{24} = 4.42$ | $\eta_{14} = 1.58123$ | $\nu_{14} = 59.5$ |
| 25 | $R_{25}$ (Aspherical surface) | $D_{25} = 0.15$ | | |
| 26 | $R_{26} = 53.180$ | $D_{26} = 7.35$ | $\eta_{15} = 1.51742$ | $\nu_{15} = 52.2$ |
| 27 | $R_{27} = -15.655$ | $D_{27} = 1.40$ | $\eta_{16} = 1.83481$ | $\nu_{16} = 42.7$ |
| 28 | $R_{28} = 71.807$ | $D_{28} = 0.25$ | | |
| 29 | $R_{29} = 42.883$ | $D_{29} = 4.74$ | $\eta_{17} = 1.58144$ | $\nu_{17} = 40.9$ |
| 30 | $R_{30} = -132.331$ | $D_{30}$ (Variable) | | |
| 31 | $R_{31} = \infty$ | $D_{31} = 2.24$ | $\eta_{18} = 1.51633$ | $\nu_{18} = 64.2$ |
| 32 | $R_{32} = \infty$ | $D_{32} = 0.60$ | | |

[zoom data]

| | Wide angle limit | Intermediate focal length | Telephoto limit |
|---|---|---|---|
| f(mm) | 18.50 | 68.50 | 194.15 |
| Fno | 3.46 | 5.52 | 6.50 |
| $D_5$ | 1.100 | 26.957 | 47.384 |
| $D_{13}$ | 22.200 | 7.961 | 2.515 |
| $D_{14}$ | 5.779 | 3.877 | 1.200 |
| $D_{16}$ | 3.762 | 5.663 | 8.340 |
| $D_{23}$ | 8.002 | 3.278 | 2.000 |
| $D_{30}$ | 19.265 | 50.936 | 63.300 |

[Asphericity]

| | R | K | $A_4$ | $A_6$ | $A_8$ | $A_{10}$ |
|---|---|---|---|---|---|---|
| $R_{16}$ | −38.107 | 0.0 | $1.2499 \times 10^{-5}$ | $6.2648 \times 10^{-10}$ | 0.0 | 0.0 |
| $R_{21}$ | −51.272 | 0.0 | $1.8273 \times 10^{-5}$ | $-4.4695 \times 10^{-8}$ | 0.0 | 0.0 |
| $R_{25}$ | −36.580 | 0.0 | $1.1438 \times 10^{-5}$ | $5.6111 \times 10^{-8}$ | $-7.1015 \times 10^{-11}$ | 0.0 |

[Amount of focus movement of the first part group at object distance of 0.5 m]

| Wide angle limit | Intermediate focal length | Telephoto limit |
|---|---|---|
| 1.320 | 2.175 | 7.409 |

With the configuration as described above. As shown in the example 1 of the following table 1, calculation values corresponding to the condition equations (1) to (7) satisfy the condition equations (1) to (7), more particularly, (1a) to (7a), respectively.

TABLE 1

| Condition equation | Calculation equation | Example 1 | Example 2 | Example 3 |
|---|---|---|---|---|
| (1) | $f_{3a}/f_t$ | 0.168 | 0.190 | 0.192 |
| (2) | $f_{3b}/f_t$ | 0.258 | 0.249 | 0.256 |
| (3) | $|f_{3c}|/f_t$ | 0.123 | 0.147 | 0.156 |
| (4) | $f_{Ra}/f_t$ | 0.152 | 0.185 | 0.181 |
| (5) | $f_{Rb}/f_t$ | 0.220 | 0.227 | 0.238 |
| (6) | $f_1/f_t$ | 0.435 | 0.434 | 0.444 |
| (7) | $|f_2|/f_t$ | 0.068 | 0.069 | 0.070 |
| (8) | $|f_{3f}|/f_t$ | — | 1.524 | 1.396 |

Spherical aberrations, astigmatisms, distortion aberrations and transverse aberrations in the vibration proof by the vibration proof zoom lens 100 of the example 1 are illustrated in FIGS. 5 to 13.

FIGS. 5A-C, 6A-C, 8A-C, 9A-C, 11A-C, and 12A-C, show spherical aberration graphs, astigmatism graphs, and distortion aberration graphs, respectively. FIGS. 5A-5C and 6A-6C represent aberrations at the time of focusing the infinity objection distance and the objection distance of 0.5 mm at the wide angle limit, respectively, FIGS. 8A-8C and 9A-9C represent aberrations at the time of focusing the infinity objection distance and the objection distance of 0.5 mm at the intermediate focal length, respectively, and FIGS. 11A-11C and 12A-12C represent aberrations at the time of focusing the infinity objection distance and the objection distance of 0.5 mm at the telephoto limit, respectively.

Units of transverse axis in the spherical aberration graphs and the astigmatism graphs are mm and units of transverse axis in the distortion aberration graphs are %. Further, units of vertical axis in the astigmatism graphs and the distortion aberration graphs are degree (deg.) (hereinafter, units in same aberration graphs are the same as above).

Figure 7:
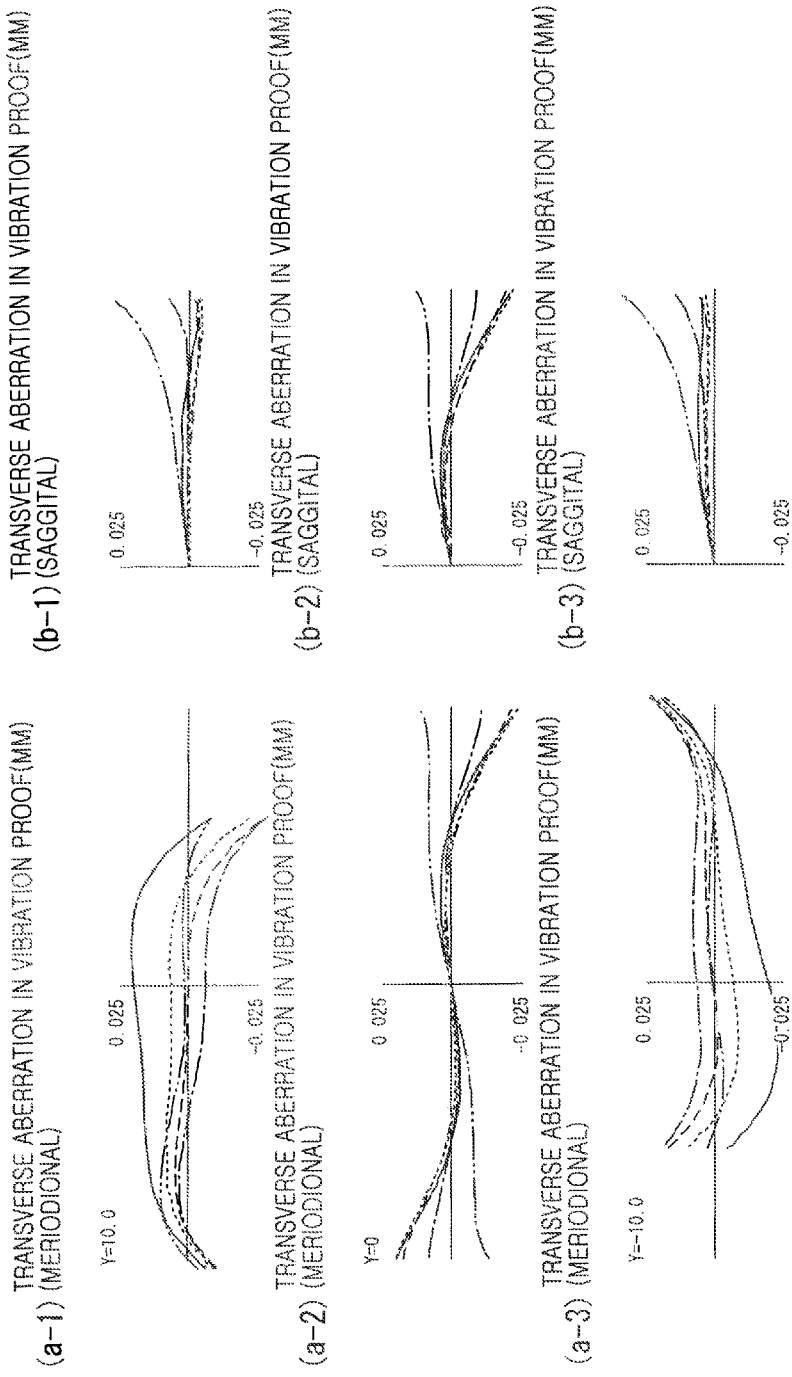
FIG. 7 is an aberration view showing a transverse aberration according to the exemplary embodiment of FIG. 1 when it vibration-proofs at the wide angle limit.
Figure 8:
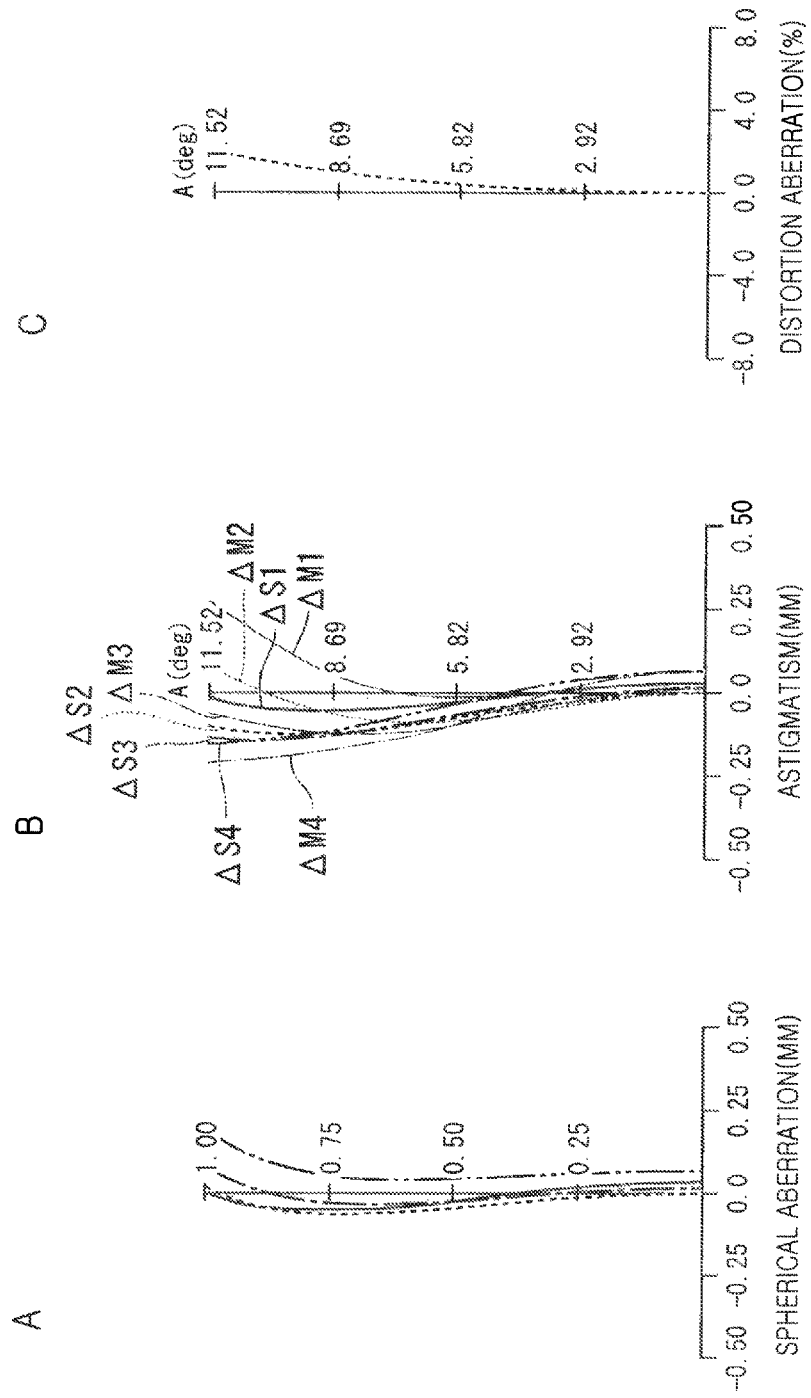
FIGS. 8A-8C are aberration views showing a spherical aberration, an astigmatism, and a distortion aberration of the vibration proof zoom lens according to the exemplary embodiment of FIG. 1 when it focuses on the infinity object distance at the intermediate focal length, respectively.
Figure 9:
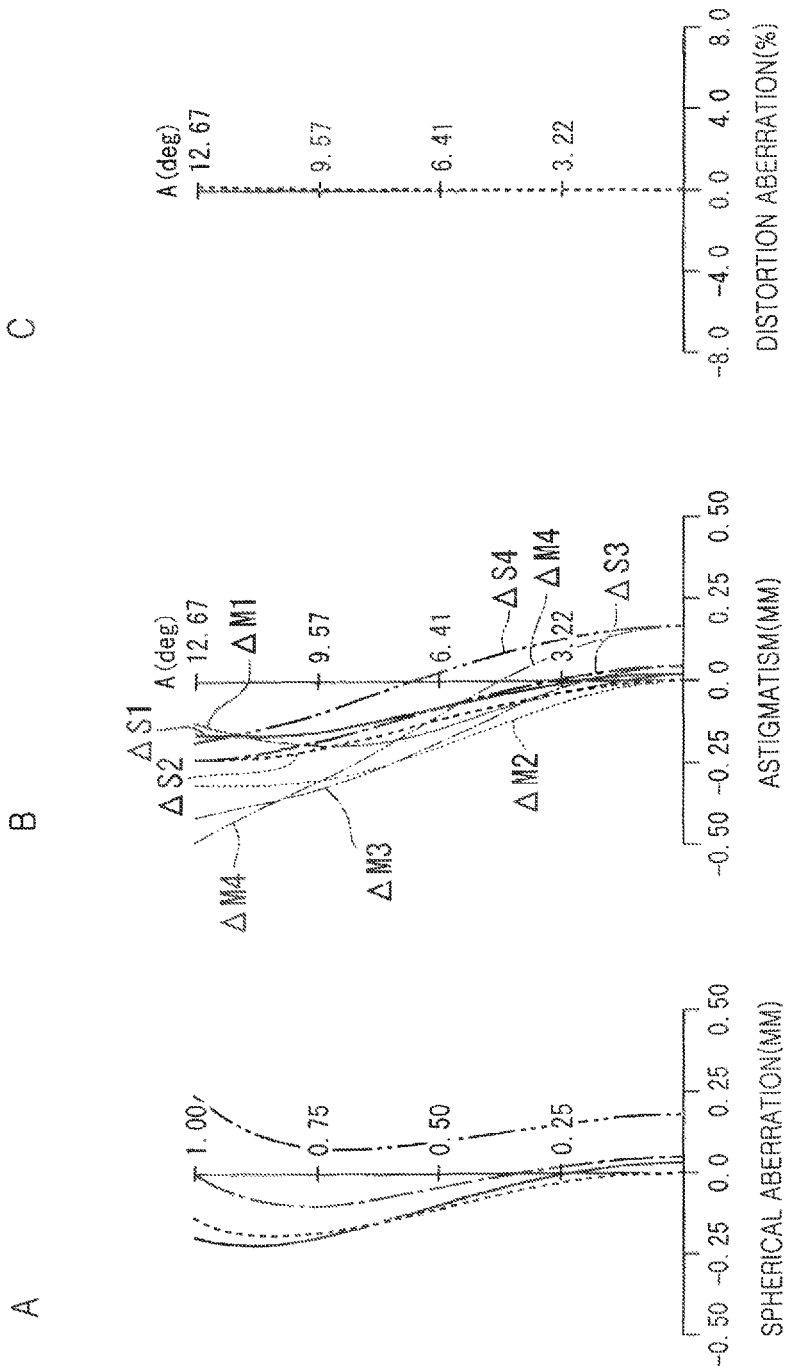
FIGS. 9A-9C are aberration views showing a spherical aberration, an astigmatism, and a distortion aberration of the vibration proof zoom lens according to the exemplary embodiment of FIG. 1 when it focuses on the object distance of 0.5 m at the intermediate focal length, respectively.
Figure 10:
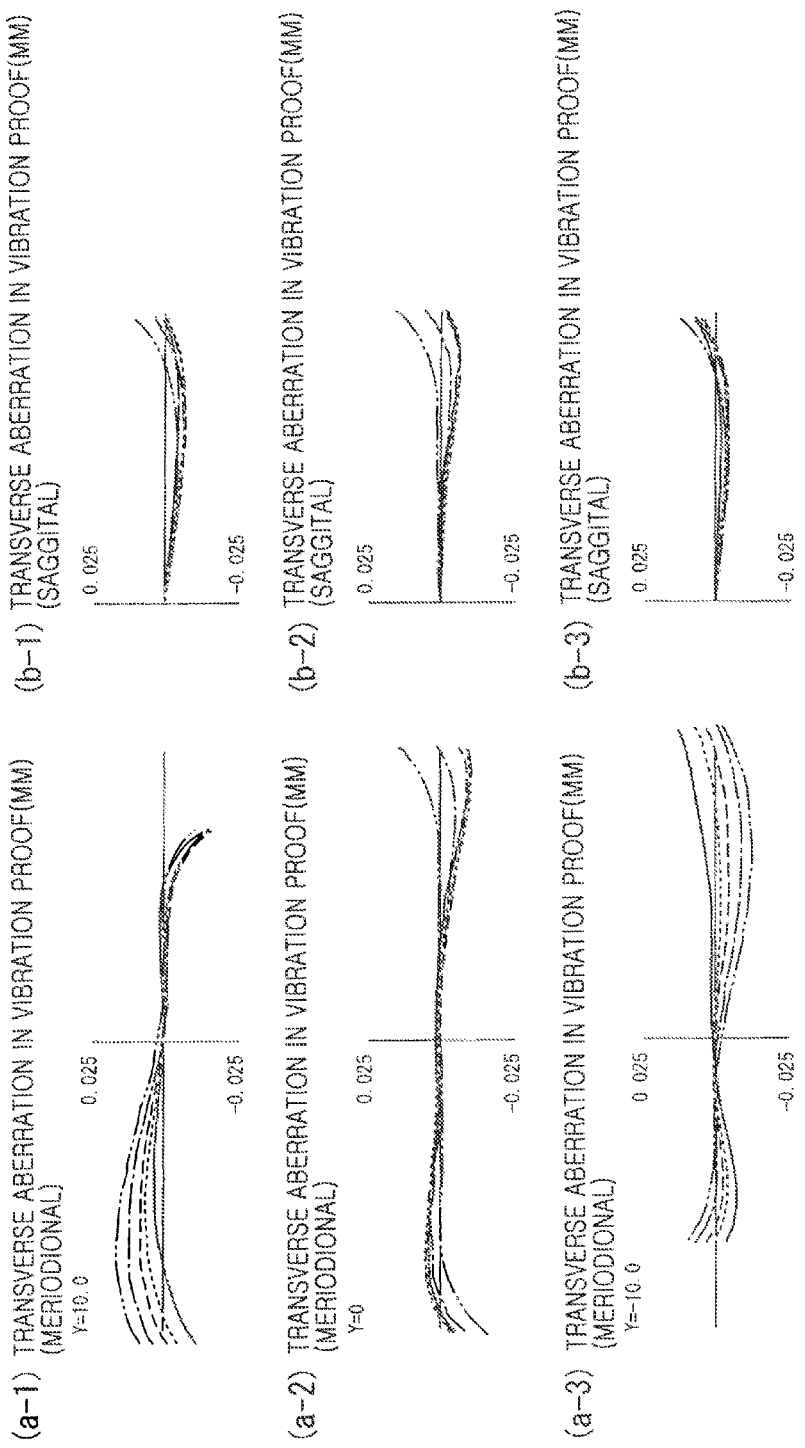
FIG. 10 is an aberration view showing a transverse aberration according to the exemplary embodiment of FIG. 1 when it vibration-proofs at the intermediate focal length.
Figure 11:
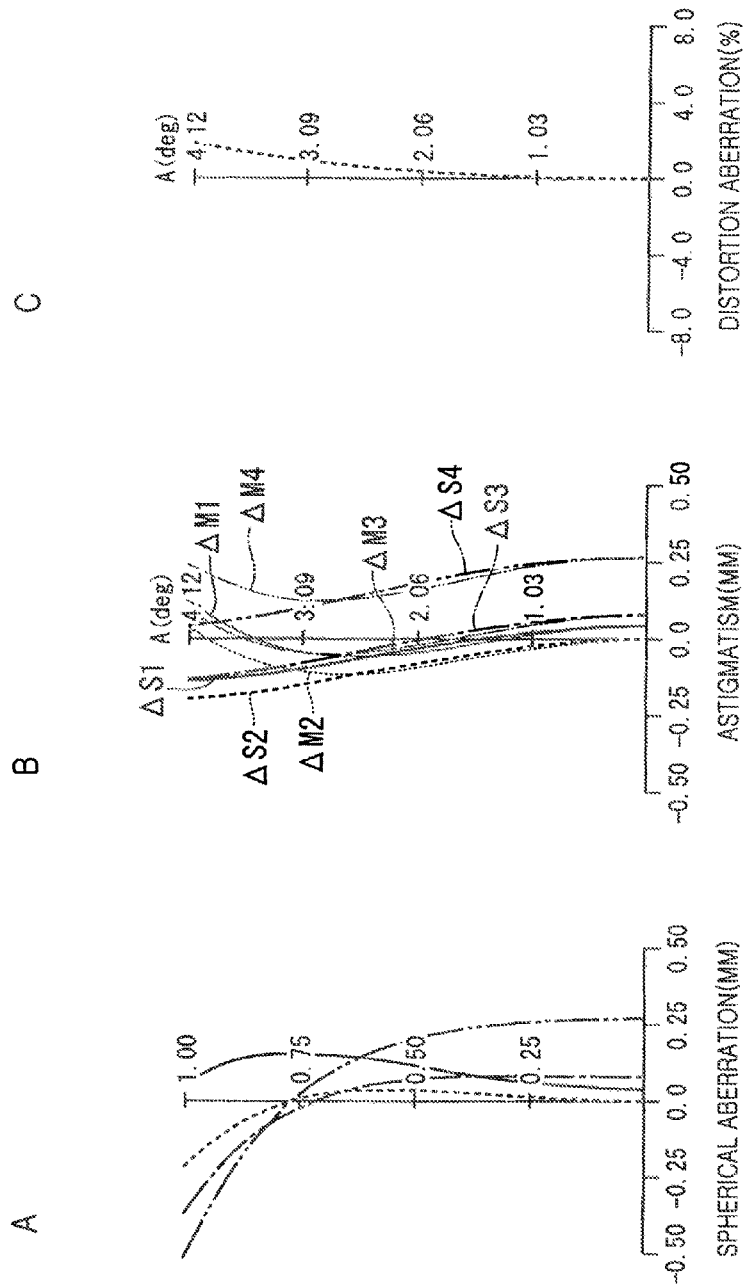
FIGS. 11A-11C are aberration views showing a spherical aberration, an astigmatism, and a distortion aberration of the vibration proof zoom lens according to the exemplary embodiment of FIG. 1 when it focuses on the infinity object distance at the telephoto limit, respectively.
Figure 12:
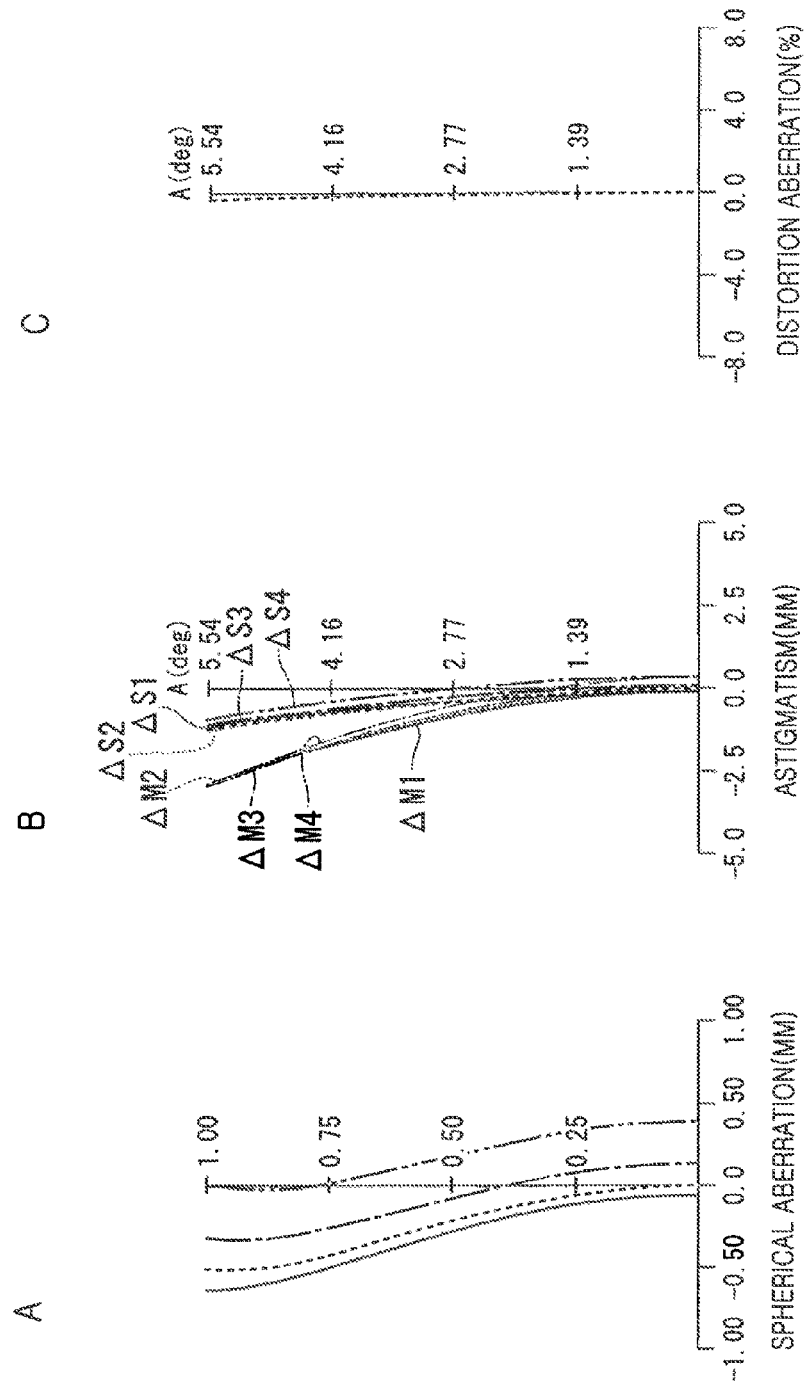
FIGS. 12A-12C are aberration views showing a spherical aberration, an astigmatism, and a distortion aberration of the vibration proof zoom lens according to the exemplary embodiment of FIG. 1 when it is in focus to the object distance of 0.5 m at the telephoto limit, respectively.
Figure 13:
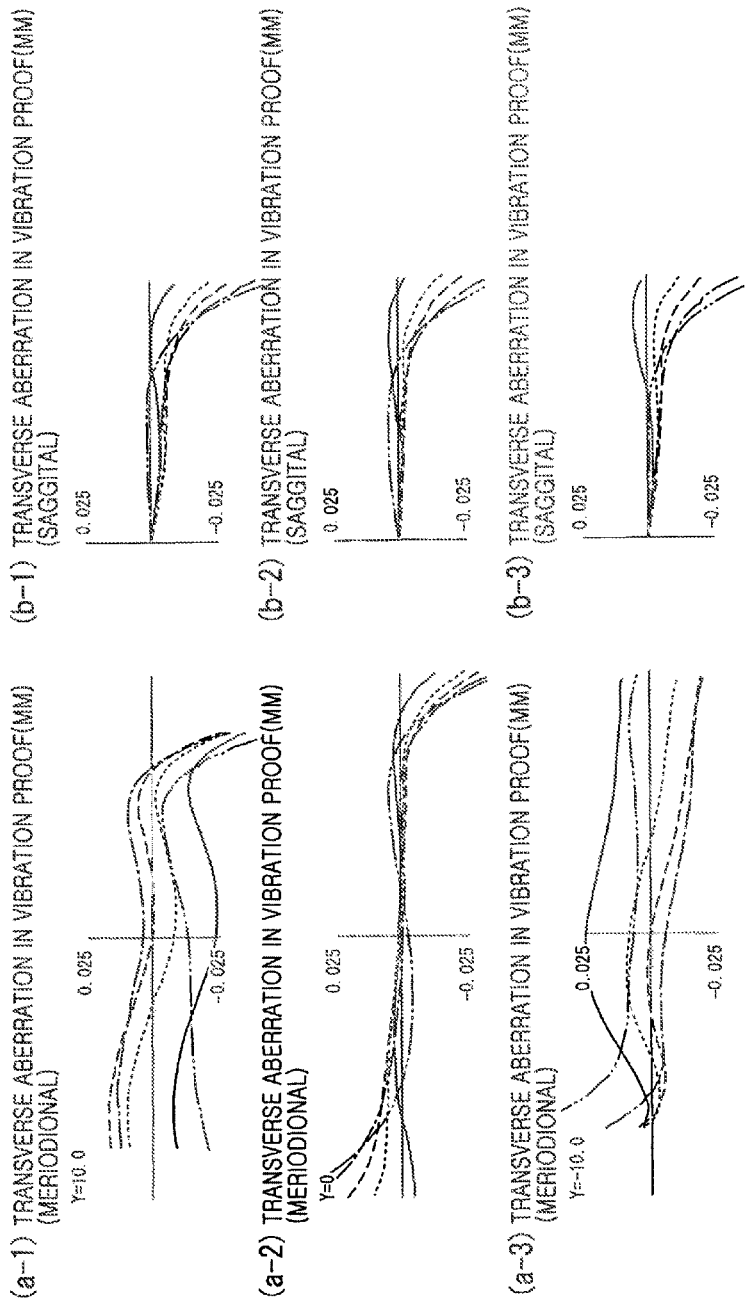
FIG. 13 is an aberration view showing a transverse aberration according to the exemplary embodiment of FIG. 1 when it vibration-proofs at the telephoto limit.
Figure 14:
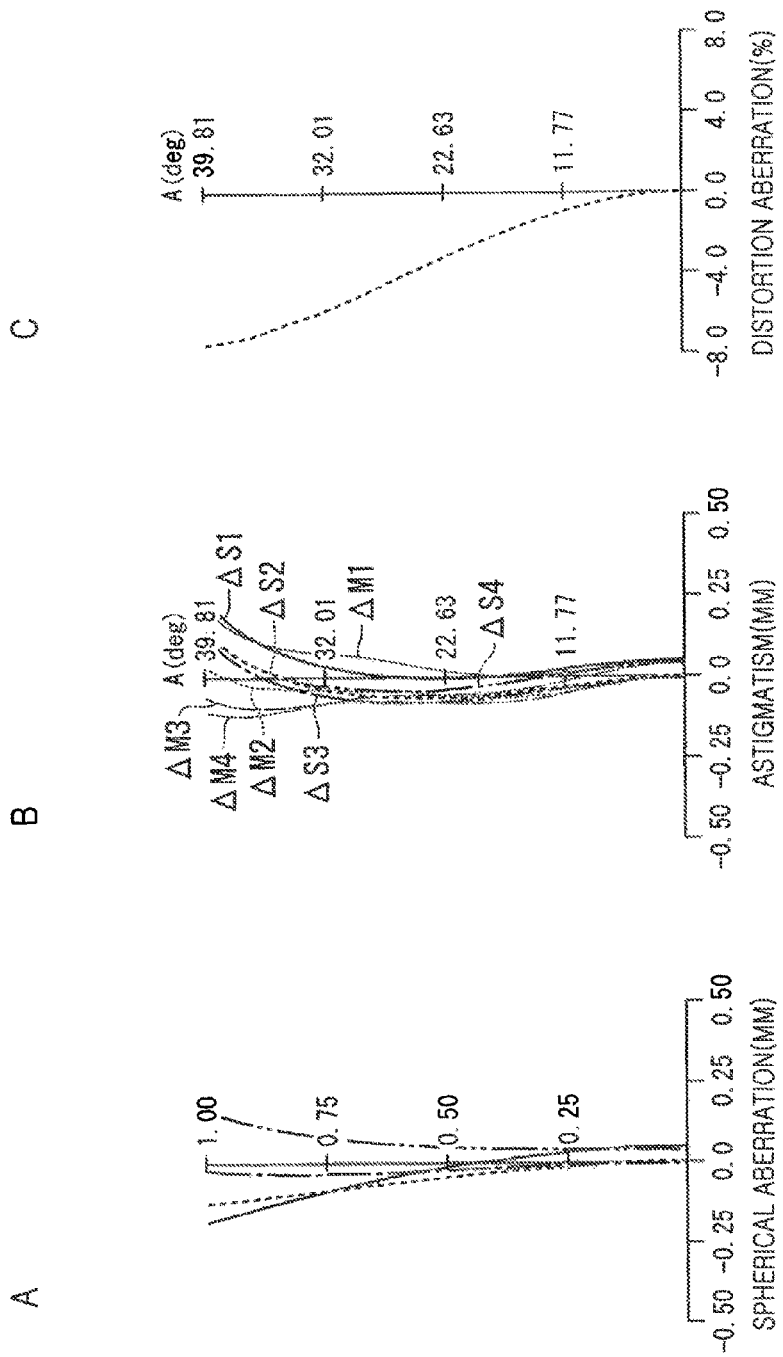
FIGS. 14A-14C are aberration views showing a spherical aberration, an astigmatism, and a distortion aberration of the vibration proof zoom lens according to the exemplary embodiment of FIG. 3 when it focuses on the infinity object distance at the wide angle limit, respectively.
Figure 15:
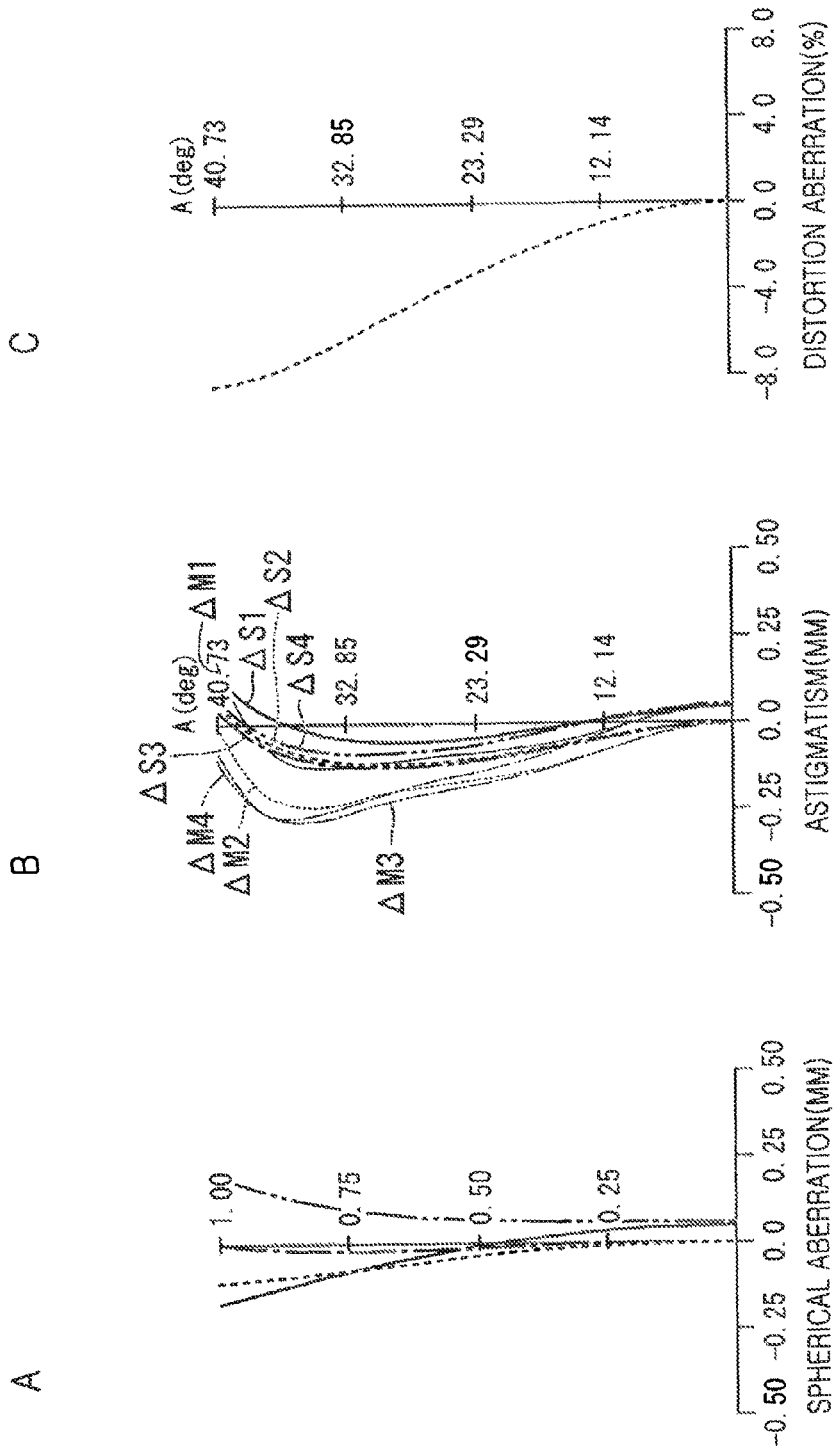
FIGS. 15A-15C are aberration views showing a spherical aberration, an astigmatism, and a distortion aberration of the vibration proof zoom lens according to the exemplary embodiment of FIG. 3 when it focuses on the object distance of 0.5 m at the wide angle limit, respectively.

FIGS. 7, 10 and 13 are aberration graphs showing transverse aberrations in the vibration proof at the wide angle limit, the intermediate focal length and the telephoto limit, respectively. In FIGS. 7, 10, and 13, sections (a-1), (a-2) and (a-3) show transverse aberrations (mm) of meridional curves at Y=10.0 (mm), Y=0 (mm) and Y=−10.0 (mm), respectively, and sections (b-1), (b-2) and (b-3) show transverse aberrations (mm) of sagittal curves corresponding to the transverse aberrations (mm) of meridional curves, respectively. Further, calculation conditions in the vibration proof are a vibration proof of 0.3 degree at a wavelength of 546.1 nm (hereinafter, calculation conditions in same aberration graphs are the same as above).

Furthermore, in the aberration graphs, solid lines, fine dotted lines, alternated long and short dash lines, alternated long and two short dashes lines and coarse fine dotted lines shows aberrations at wavelengths of 656.3 nm, 546.1 nm, 486.1 nm, 435.8 nm and 587.6 nm, respectively (hereinafter, lines in same aberration graphs are the same as above).

Also, the astigmatism graphs show the astigmatisms of the sagittal curves by thick curves designated by marks ΔS1, . . . , ΔS1, and the astigmatisms of the meridional curves by thin curves designated by marks ΔM1, . . . , ΔM1.

Referring to FIGS. 5A to 13, it can be appreciated that with the vibration proof zoom lens 100 of the present example, the spherical aberrations, the astigmatisms, and the distortion aberrations were well corrected within the object distance from the infinity to the 0.5 m at the wide angle limit, the intermediate focal length and the telephoto limit and at the same time, the transverse aberrations in the vibration proof were good.

Example 2

Next, an example 2, which is an example of numerical value of the vibration proof zoom lens system 101 illustrated in the exemplary embodiment of FIGS. 3A-3C as described above will be explained.

The below table shows configuration parameters of the vibration proof zoom lens system 101 of the example 2. A surface number j (j is a natural number) is distributed in the same manner as in the example 1. For instance, the cemented surface 21a is a surface number 2, and the aspherical surface 27a is a surface number 18.

| Surface number | Radius of curvature(R) | Surface clearance(D) | refractive index($\eta_d$) | Abbe's number($v_d$) |
|---|---|---|---|---|
| 1 | $R_1 = 108.692$ | $D_1 = 1.50$ | $\eta_1 = 1.80518$ | $v_1 = 25.5$ |
| 2 | $R_2 = 59.849$ | $D_2 = 8.13$ | $\eta_2 = 1.49700$ | $v_2 = 81.6$ |
| 3 | $R_3 = -431.693$ | $D_3 = 0.15$ | | |
| 4 | $R_4 = 52.307$ | $D_4 = 5.80$ | $\eta_3 = 1.62041$ | $v_3 = 60.3$ |
| 5 | $R_5 = 179.739$ | $D_5$ (Variable) | | |
| 6 | $R_6 = 141.166$ | $D_6 = 1.30$ | $\eta_4 = 1.83481$ | $v_4 = 42.7$ |
| 7 | $R_7 = 13.905$ | $D_7 = 5.96$ | | |
| 8 | $R_8 = -32.856$ | $D_8 = 1.10$ | $\eta_5 = 1.83481$ | $v_5 = 42.7$ |
| 9 | $R_9 = 68.778$ | $D_9 = 0.15$ | | |
| 10 | $R_{10} = 30.271$ | $D_{10} = 5.54$ | $\eta_6 = 1.84666$ | $v_6 = 23.8$ |
| 11 | $R_{11} = -23.286$ | $D_{11} = 0.14$ | | |
| 12 | $R_{12} = -21.908$ | $D_{12} = 1.00$ | $\eta_7 = 1.80420$ | $v_7 = 46.5$ |
| 13 | $R_{13} = 138.173$ | $D_{13}$ (Variable) | | |
| 14 | $R_{14} = -67.159$ | $D_{14} = 1.20$ | $\eta_8 = 1.74400$ | $v_8 = 44.9$ |
| 15 | $R_{15} = -97.151$ | $D_{15} = 1.00$ | | |
| 16 | $R_{16}$ (Aperture) | $D_{16}$ (Variable) | | |
| 17 | $R_{17} = 37.586$ | $D_{17} = 3.20$ | $\eta_9 = 1.58673$ | $v_9 = 61.3$ |
| 18 | $R_{18} =$ (Aspherical surface) | $D_{18}$ (Variable) | | |
| 19 | $R_{19} = 17.435$ | $D_{19} = 4.95$ | $\eta_{10} = 1.49700$ | $v_{10} = 81.6$ |
| 20 | $R_{20} = -58.546$ | $D_{20} = 0.90$ | $\eta_{11} = 1.84666$ | $v_{11} = 23.8$ |
| 21 | $R_{21} = 38.554$ | $D_{21} = 2.43$ | $\eta_{12} = 1.51742$ | $v_{12} = 52.2$ |
| 22 | $R_{22} = -83.758$ | $D_{22} = 2.50$ | | |
| 23 | $R_{23}$ (Aspherical surface) | $D_{23} = 1.20$ | $\eta_{13} = 1.69090$ | $v_{13} = 53.3$ |
| 24 | $R_{24} = 12.066$ | $D_{24} = 2.87$ | $\eta_{14} = 1.72825$ | $v_{14} = 28.3$ |
| 25 | $R_{25} = 25.316$ | $D_{25}$ (Variable) | | |
| 26 | $R_{26} = 25.223$ | $D_{26} = 4.68$ | $\eta_{15} = 1.53123$ | $v_{15} = 59.5$ |
| 27 | $R_{27}$ (Aspherical surface) | $D_{27} = 0.15$ | | |
| 28 | $R_{28} = 46.924$ | $D_{28} = 7.57$ | $\eta_{16} = 1.51742$ | $v_{16} = 52.2$ |
| 29 | $R_{29} = -11.984$ | $D_{29} = 1.40$ | $\eta_{17} = 1.83481$ | $v_{17} = 42.7$ |
| 30 | $R_{30} = 29.549$ | $D_{30} = 0.43$ | | |
| 31 | $R_{31} = 27.366$ | $D_{31} = 4.74$ | $\eta_{18} = 1.58144$ | $v_{18} = 40.9$ |
| 32 | $R_{32} = -91.492$ | $D_{32}$ (Variable) | | |
| 33 | $R_{33} = \infty$ | $D_{33} = 2.24$ | $\eta_{18} = 1.51633$ | $v_{18} = 64.1$ |
| 34 | $R_{34} = \infty$ | $D_{32} = 0.60$ | | |

[zoom data]

| | Wide angle limit | Intermediate focal length | Telephoto limit |
|---|---|---|---|
| f(mm) | 18.50 | 68.50 | 194.15 |
| Fno | 3.55 | 5.81 | 6.50 |
| $D_5$ | 1.100 | 26.203 | 48.034 |
| $D_{13}$ | 19.455 | 6.684 | 1.916 |
| $D_{16}$ | 6.812 | 4.301 | 1.200 |
| $D_{18}$ | 2.288 | 4.799 | 7.900 |
| $D_{25}$ | 6.328 | 3.191 | 2.000 |
| $D_{32}$ | 20.757 | 52.134 | 60.319 |

-continued

[Asphericity]

|  | R | K | $A_4$ | $A_6$ | $A_8$ | $A_{10}$ |
|---|---|---|---|---|---|---|
| $R_{18}$ | −49.701 | 0.0 | $8.6468 \times 10^{-6}$ | $-6.0751 \times 10^{-9}$ | 0.0 | 0.0 |
| $R_{23}$ | −77.659 | 0.0 | $1.1980 \times 10^{-5}$ | $-3.0461 \times 10^{-8}$ | 0.0 | 0.0 |
| $R_{27}$ | −58.820 | 0.0 | $1.4007 \times 10^{-5}$ | $1.2894 \times 10^{-8}$ | $-9.8111 \times 10^{-10}$ | 0.0 |

[Amount of focus movement of the first part group at object distance of 0.5 m]

| Wide angle limit | Intermediate focal length | Telephoto limit |
|---|---|---|
| 0.691 | 1.750 | 6.822 |

With the configuration as described above. As shown in the example 2 of the above table 1, calculation values corresponding to the condition equations (1) to (8) satisfy the condition equations (1) to (8), more particularly, (1a) to (8a), respectively.

Spherical aberrations, astigmatisms, distortion aberrations and transverse aberrations in the vibration proof by the vibration proof zoom lens 101 of the present example are illustrated in FIGS. 14A to 22.

FIGS. 14A-C, 15A-C, 17A-C, 18A-C, 20A-C, and 21A-C show spherical aberration graphs, astigmatism graphs, and distortion aberration graphs, respectively. FIGS. 14A-14C and 15A-15C represent aberrations at the time of focusing the infinity objection distance and the objection distance of 0.5 mm at the wide angle limit, respectively, FIGS. 17A-17C and 18A-18C represent aberrations at the time of focusing the infinity objection distance and the objection distance of 0.5 mm at the intermediate focal length, respectively, and FIGS. 20A-20C and 21A-21C represent aberrations at the time of focusing the infinity objection distance and the objection distance of 0.5 mm at the telephoto limit, respectively.

Figure 16:
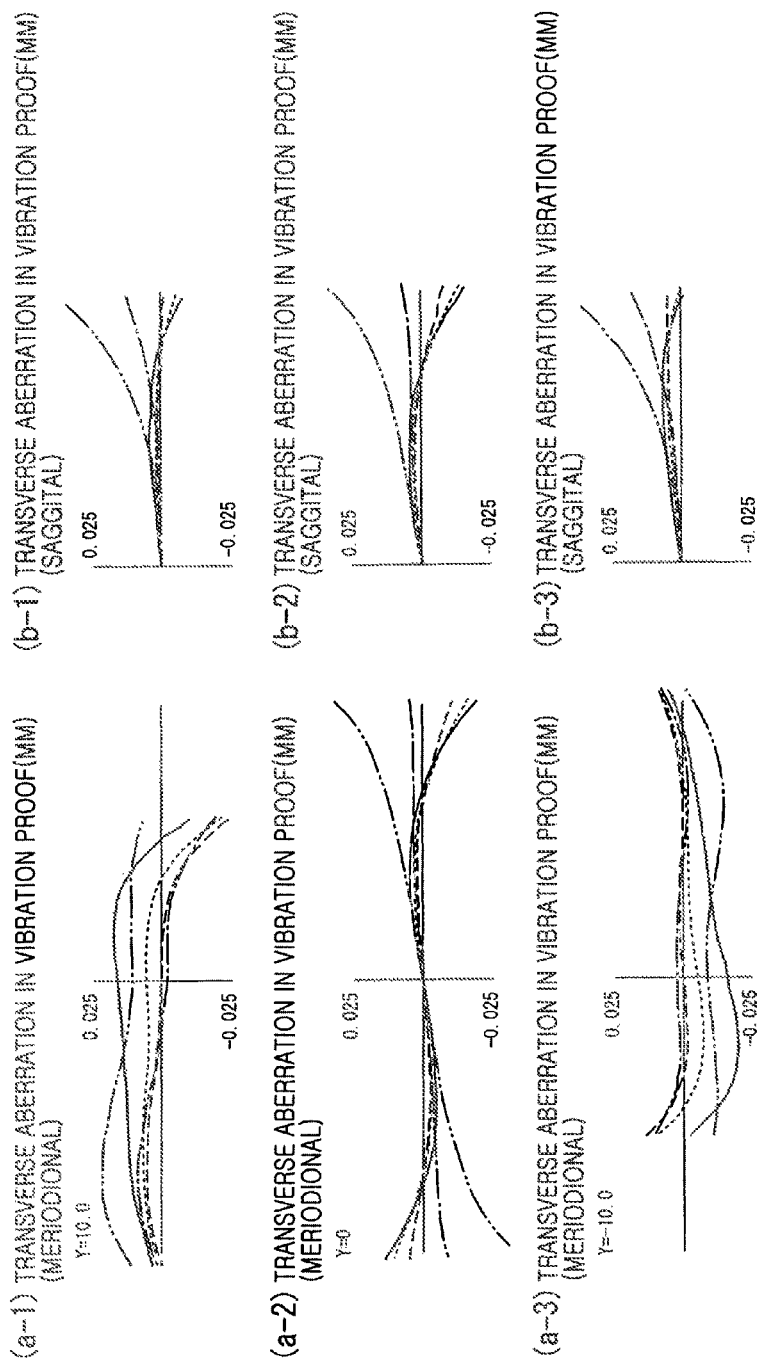
FIG. 16 is an aberration view showing a transverse aberration according to the exemplary embodiment of FIG. 3 when it vibration-proofs at the wide angle limit.
Figure 17:
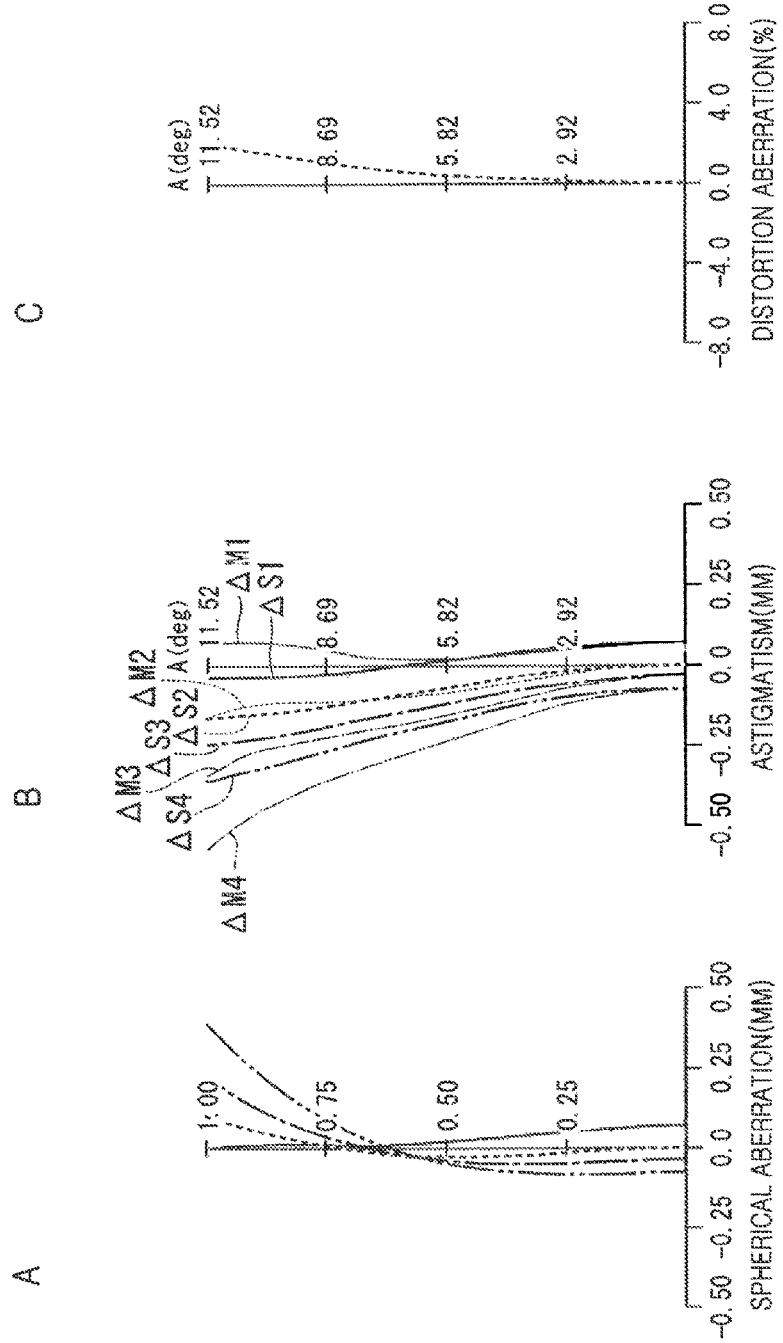
FIGS. 17A-17C are aberration views showing a spherical aberration, an astigmatism, and a distortion aberration of the vibration proof zoom lens according to the exemplary embodiment of FIG. 3 when it focuses on the infinity object distance at the intermediate focal length, respectively.
Figure 18:
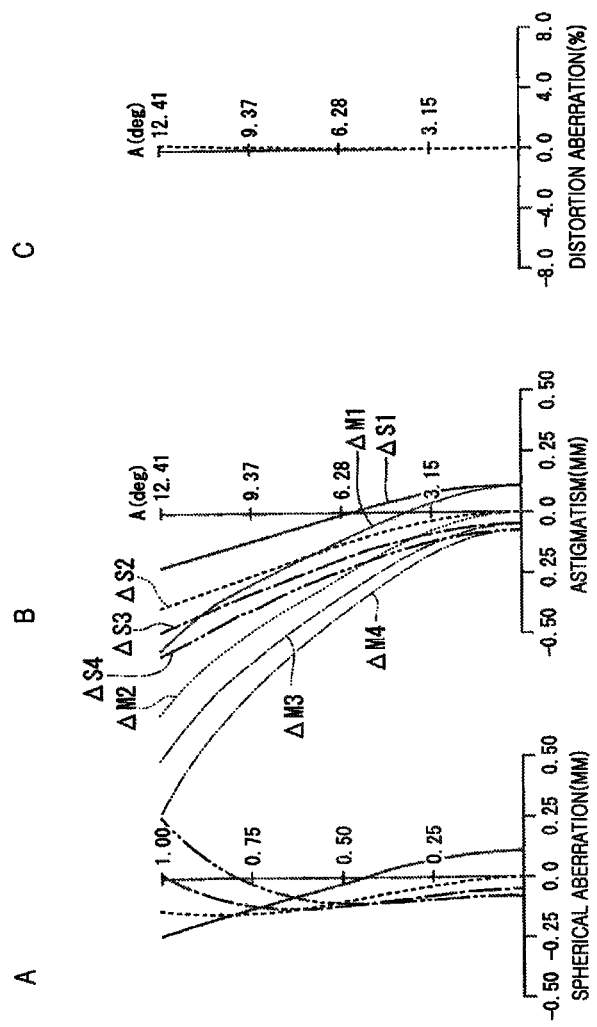
FIGS. 18A-18C are aberration views showing a spherical aberration, an astigmatism, and a distortion aberration of the vibration proof zoom lens according to the exemplary embodiment of FIG. 3 when it focuses on the object distance of 0.5 m at the intermediate focal length, respectively.
Figure 19:
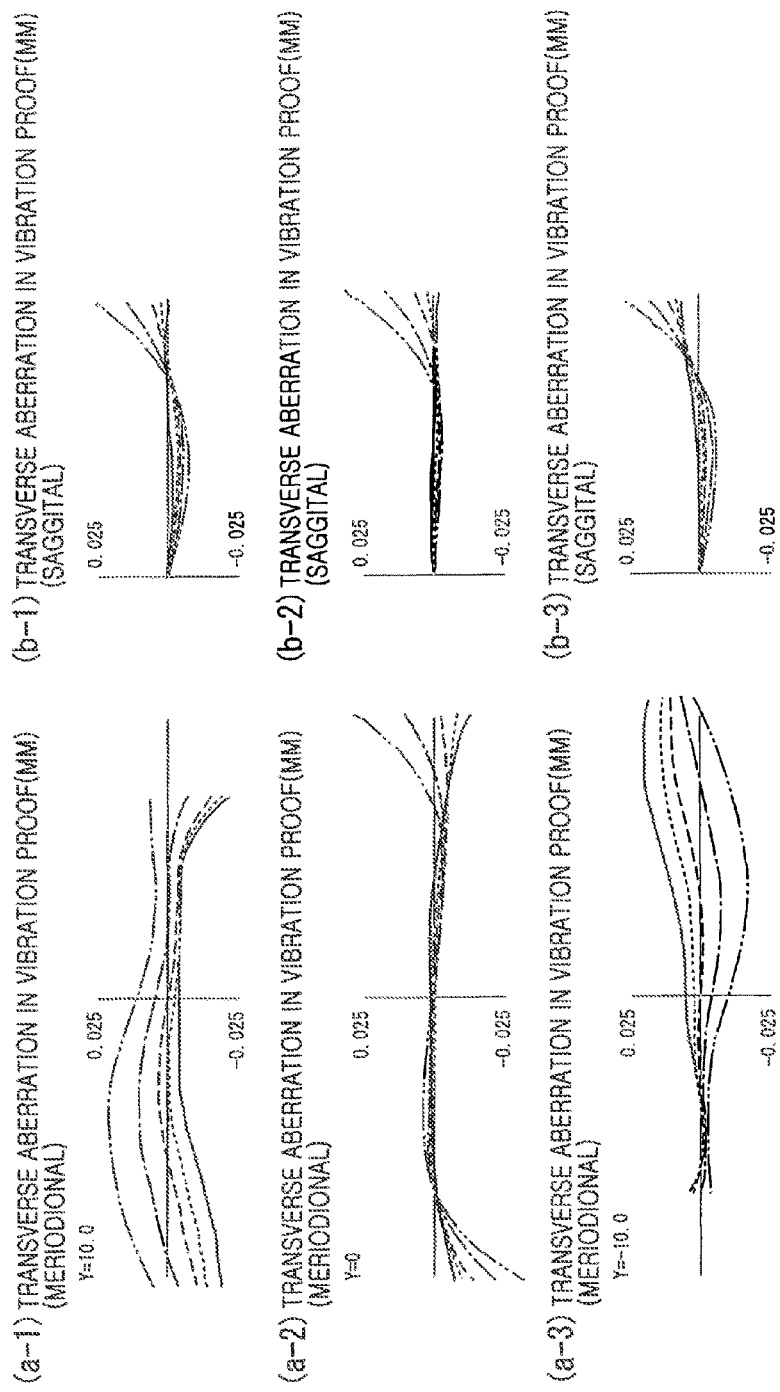
FIG. 19 is an aberration view showing a transverse aberration according to the exemplary embodiment of FIG. 3 when it vibration-proofs at the intermediate focal length.
Figure 20:
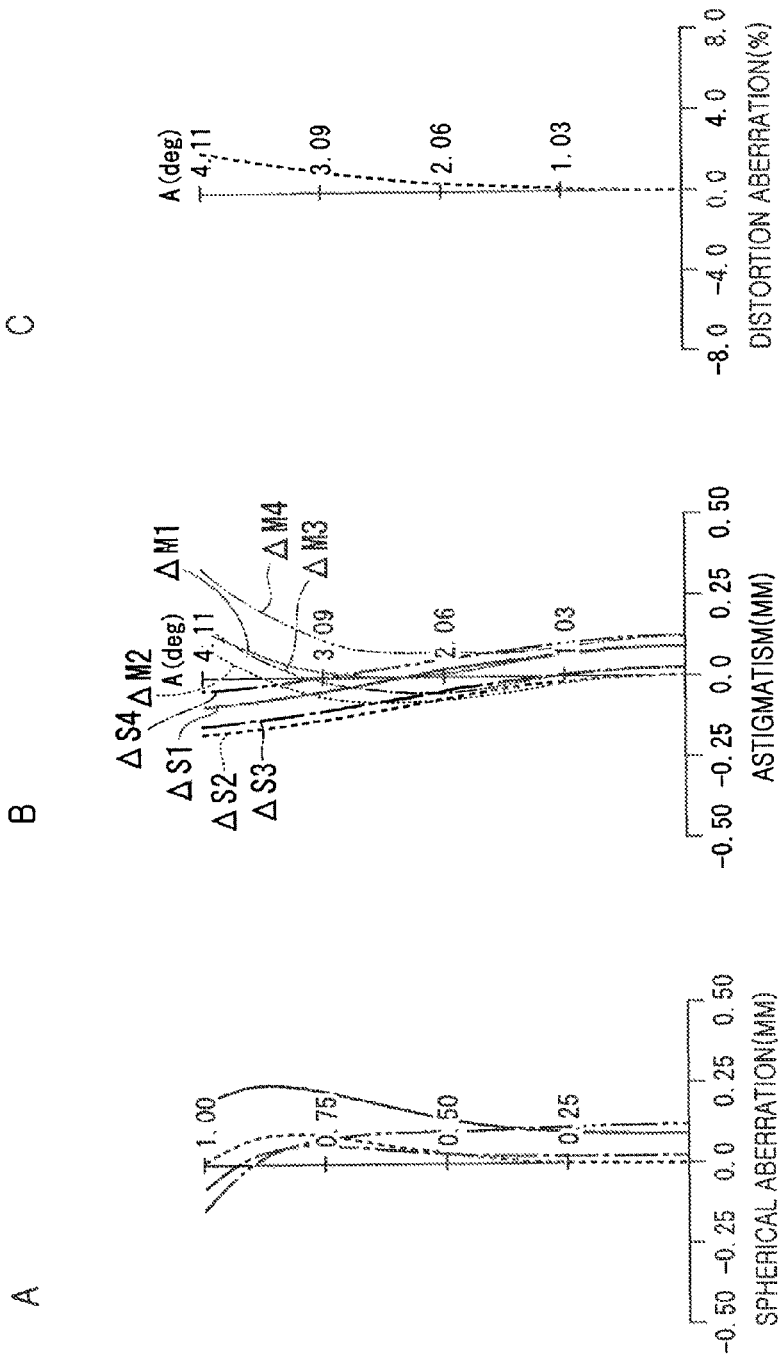
FIGS. 20A-20C are aberration views showing a spherical aberration, an astigmatism, and a distortion aberration of the vibration proof zoom lens according to the exemplary embodiment of FIG. 3 when it focuses on the infinity object distance at the telephoto limit, respectively.
Figure 21:
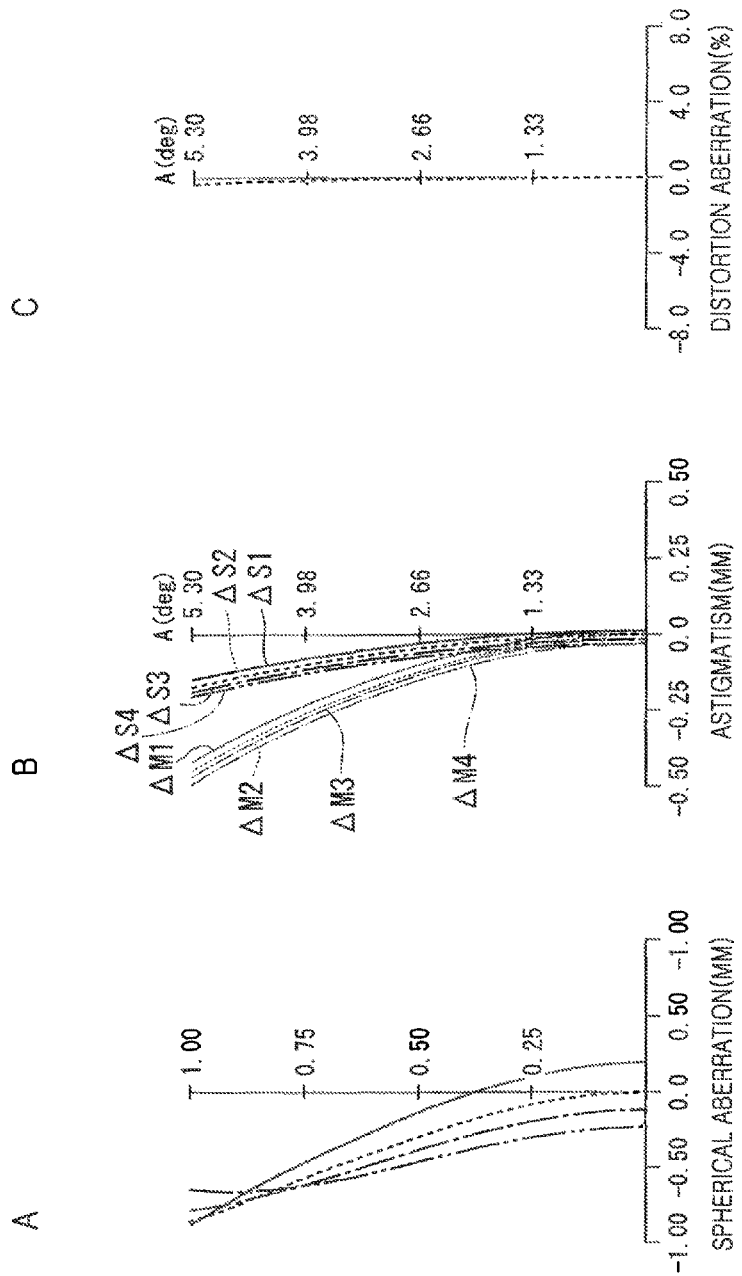
FIGS. 21A-21C are aberration views showing a spherical aberration, an astigmatism, and a distortion aberration of the vibration proof zoom lens according to the exemplary embodiment of FIGS. 3A-3C when it focuses on the object distance of 0.5 m at the telephoto limit, respectively.
Figure 22:
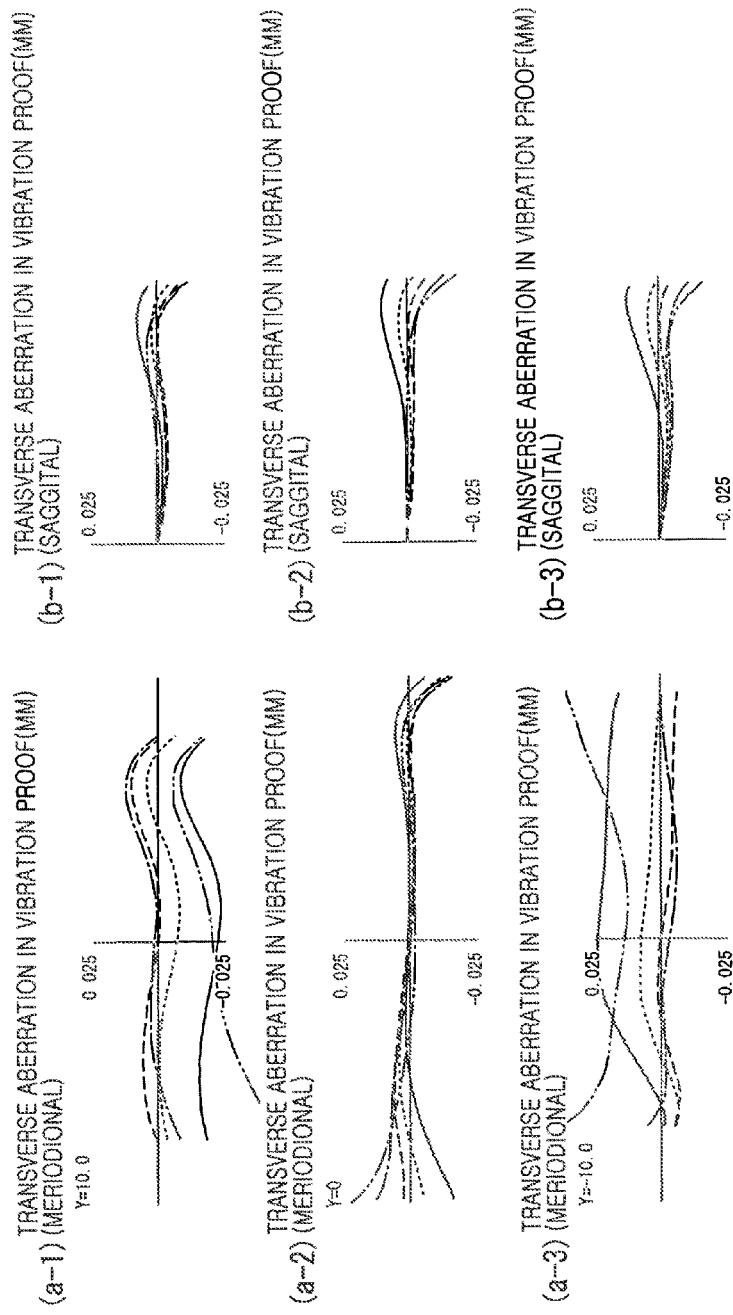
FIG. 22 is an aberration view showing a transverse aberration according to the exemplary embodiment of FIGS. 3A-3C when it vibration-proofs at the telephoto limit.
Figure 23:
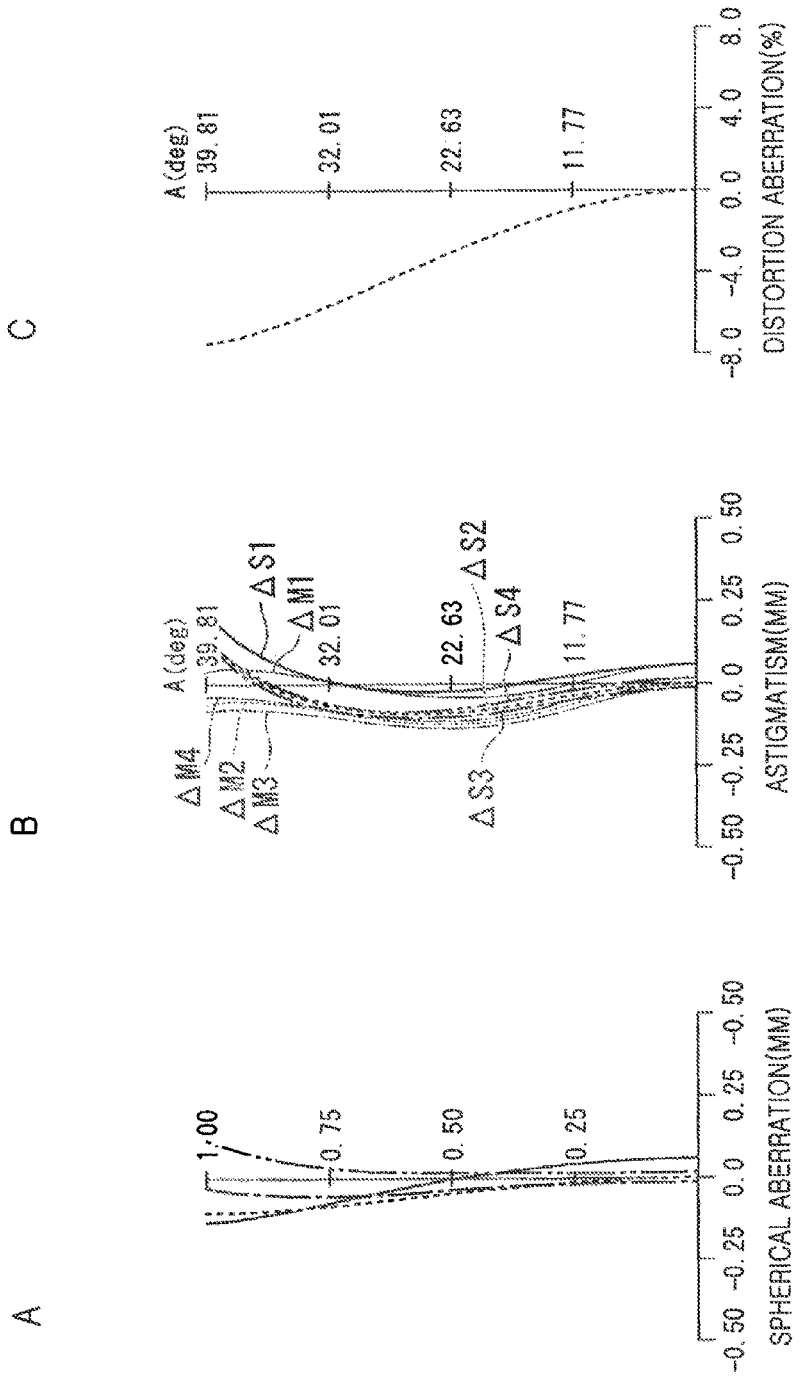
FIGS. 23A-23C are aberration views showing a spherical aberration, an astigmatism, and a distortion aberration of the vibration proof zoom lens according to the exemplary embodiment of FIGS. 4A-4C when it focuses on the infinity object distance at the wide angle limit, respectively.
Figure 24:
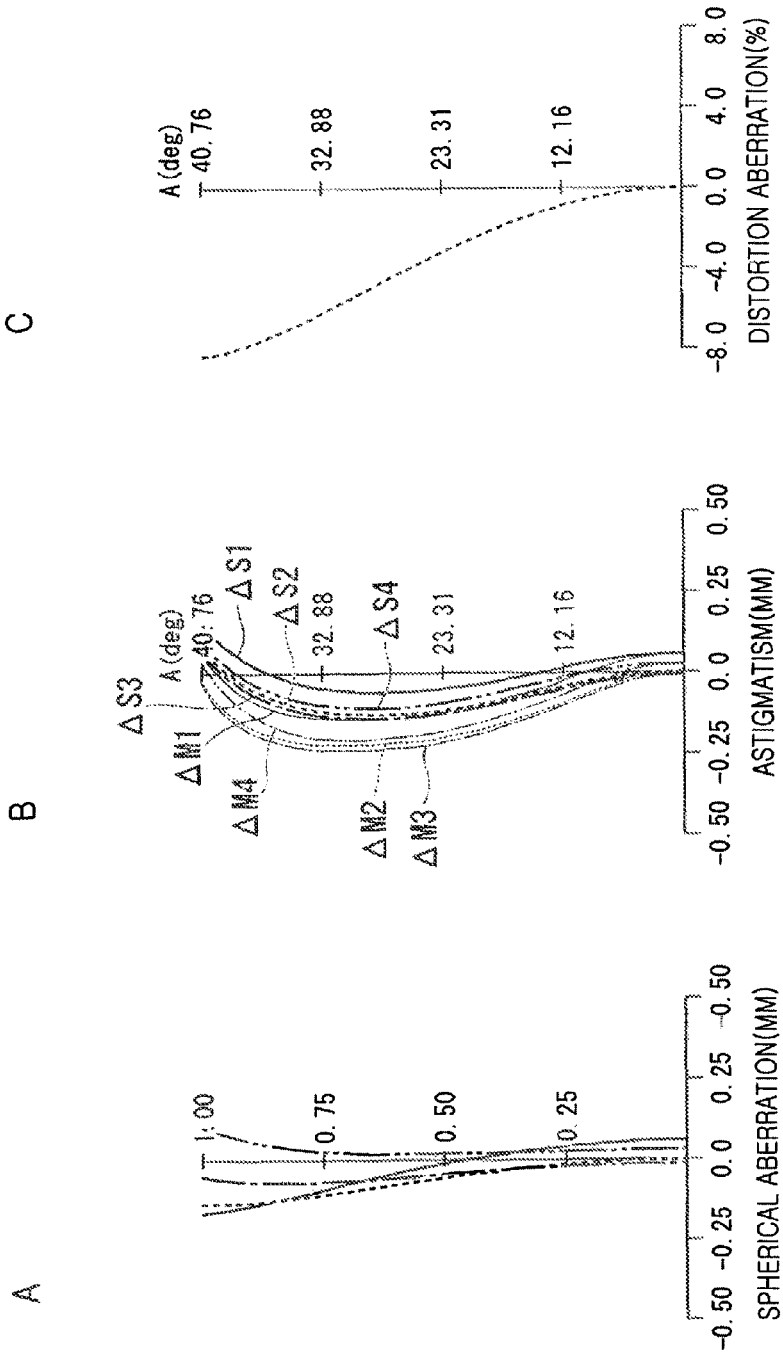
FIGS. 24A-24C are aberration views showing a spherical aberration, an astigmatism, and a distortion aberration of the vibration proof zoom lens according to the exemplary embodiment of FIGS. 4A-4C when it is in focus to the object distance at 0.5 m at the wide angle limit, respectively.

FIGS. 16, 19 and 22 are aberration graphs showing transverse aberrations in the vibration proof at the wide angle limit, the intermediate focal length and the telephoto limit, respectively.

Referring to FIGS. 14A to 22, it can be appreciated that with the vibration proof zoom lens 101 of the present example, the spherical aberrations, the astigmatisms, and the distortion aberrations were well corrected within the object distance from the infinity to the 0.5 m at the wide angle limit, the intermediate focal length and the telephoto limit and at the same time, the transverse aberrations in the vibration proof were good.

Example 3

Next, an example 3, which is an example of numerical value of the vibration proof zoom lens system 102 illustrated in the exemplary embodiment of FIGS. 4A-4C as described above will be explained.

The below table shows configuration parameters of the vibration proof zoom lens system 102 of the example 3. A surface number j (j is a natural number) is distributed in the same manner as in the example 1. For instance, the cemented surface 41a is a surface number 2, and the aspherical surface 47a is a surface number 18.

| Surface number | Radius of curvature(R) | Surface clearance(D) | refractive index($\eta_d$) | Abbe's number($\nu_d$) |
|---|---|---|---|---|
| 1 | $R_1$ = 97.141 | $D_1$ = 1.50 | $\eta_1$ = 1.80518 | $\nu_1$ = 25.4 |
| 2 | $R_2$ = 59.007 | $D_2$ = 7.88 | $\eta_2$ = 1.49700 | $\nu_2$ = 81.6 |
| 3 | $R_3$ = −800.000 | $D_3$ = 0.15 | | |
| 4 | $R_4$ = 53.855 | $D_4$ = 5.70 | $\eta_3$ = 1.59282 | $\nu_3$ = 68.6 |
| 5 | $R_5$ = 191.269 | $D_5$ (Variable) | | |
| 6 | $R_6$ = 142.685 | $D_6$ = 1.30 | $\eta_4$ = 1.83481 | $\nu_4$ = 42.7 |
| 7 | $R_7$ = 14.165 | $D_7$ = 6.19 | | |
| 8 | $R_8$ = −38.401 | $D_8$ = 1.10 | $\eta_5$ = 1.83481 | $\nu_5$ = 42.7 |
| 9 | $R_9$ = 56.480 | $D_9$ = 0.15 | | |
| 10 | $R_{10}$ = 27.550 | $D_{10}$ = 5.70 | $\eta_6$ = 1.84666 | $\nu_6$ = 23.8 |
| 11 | $R_{11}$ = −27.550 | $D_{11}$ = 0.26 | | |
| 12 | $R_{12}$ = −24.275 | $D_{12}$ = 1.00 | $\eta_7$ = 1.80420 | $\nu_7$ = 46.5 |
| 13 | $R_{13}$ = 126.878 | $D_{13}$ (Variable) | | |
| 14 | $R_{14}$ = 366.767 | $D_{14}$ = 1.20 | $\eta_8$ = 1.74400 | $\nu_8$ = 44.9 |
| 15 | $R_{15}$ = 130.359 | $D_{15}$ = 1.43 | | |
| 16 | $R_{16}$ (Aperture) | $D_{16}$ (Variable) | | |
| 17 | $R_{17}$ = 42.013 | $D_{17}$ = 3.15 | $\eta_9$ = 1.58673 | $\nu_9$ = 61.3 |
| 18 | $R_{18}$ = (Aspherical surface) | $D_{18}$ (Variable) | | |
| 19 | $R_{19}$ = 16.032 | $D_{19}$ = 4.82 | $\eta_{10}$ = 1.49700 | $\nu_{10}$ = 81.6 |
| 20 | $R_{20}$ = −193.374 | $D_{20}$ = 0.90 | $\eta_{11}$ = 1.8666 | $\nu_{11}$ = 23.8 |
| 21 | $R_{21}$ = 30.530 | $D_{21}$ = 2.39 | $\eta_{12}$ = 1.48749 | $\nu_{12}$ = 70.4 |
| 22 | $R_{22}$ = −319.245 | $D_{22}$ = 2.62 | | |
| 23 | $R_{23}$ (Aspherical surface) | $D_{23}$ = 1.20 | $\eta_{13}$ = 1.69090 | $\nu_{13}$ = 53.3 |
| 24 | $R_{24}$ = 12.048 | $D_{24}$ = 2.97 | $\eta_{14}$ = 1.69895 | $\nu_{14}$ = 30.1 |
| 25 | $R_{25}$ = 26.462 | $D_{25}$ (Variable) | | |
| 26 | $R_{26}$ = 27.692 | $D_{26}$ = 4.45 | $\eta_{15}$ = 1.58123 | $\nu_{15}$ = 59.5 |
| 27 | $R_{27}$ (Aspherical surface) | $D_{27}$ = 0.15 | | |
| 28 | $R_{28}$ = 53.280 | $D_{28}$ = 7.03 | $\eta_{16}$ = 1.53172 | $\nu_{16}$ = 48.8 |
| 29 | $R_{29}$ = −12.400 | $D_{29}$ = 1.40 | $\eta_{17}$ = 1.83481 | $\nu_{17}$ = 42.7 |

-continued

| 30 | $R_{30} = 32.417$ | $D_{30} = 0.27$ | | |
| 31 | $R_{31} = 26.783$ | $D_{31} = 4.30$ | $\eta_{18} = 1.59551$ | $\nu_{18} = 39.2$ |
| 32 | $R_{32} = -294.154$ | $D_{32}$ (Variable) | | |
| 33 | $R_{33} = \infty$ | $D_{33} = 2.24$ | $\eta_{18} = 1.51633$ | $\nu_{18} = 64.1$ |
| 34 | $R_{34} = \infty$ | $D_{32} = 0.60$ | | |

[zoom data]

| | Wide angle limit | Intermediate focal length | Telephoto limit |
|---|---|---|---|
| f(mm) | 18.50 | 68.50 | 194.15 |
| Fno | 3.52 | 5.62 | 6.50 |
| $D_5$ | 1.100 | 27.358 | 48.606 |
| $D_{13}$ | 20.647 | 3.627 | 1.514 |
| $D_{16}$ | 6.096 | 6.755 | 1.200 |
| $D_{18}$ | 3.588 | 2.929 | 8.484 |
| $D_{25}$ | 5.624 | 3.300 | 2.000 |
| $D_{32}$ | 20.368 | 49.382 | 60.156 |

[Asphericity]

| | R | K | $A_4$ | $A_6$ | $A_8$ | $A_{10}$ |
|---|---|---|---|---|---|---|
| $R_{18}$ | -44.530 | 0.0 | $9.0354 \times 10^{-6}$ | $-2.3869 \times 10^{-9}$ | 0.0 | 0.0 |
| $R_{23}$ | -102.580 | 0.0 | $1.2632 \times 10^{-5}$ | $-3.6389 \times 10^{-8}$ | 0.0 | 0.0 |
| $R_{25}$ | -50.974 | 0.0 | $2.0732 \times 10^{-5}$ | $5.6406 \times 10^{-8}$ | $-6.0181 \times 10^{-10}$ | 0.0 |

[Amount of focus movement of the first part group at object distance of 0.5 m]

| Wide angle limit | Intermediate focal length | Telephoto limit |
|---|---|---|
| 0.692 | 1.852 | 6.762 |

With the configuration as described above. As shown in the example 3 of the above table 1, calculation values corresponding to the condition equations (1) to (8) satisfy the condition equations (1) to (8), more particularly, (1a) to (8a), respectively.

Spherical aberrations, astigmatisms, distortion aberrations and transverse aberrations in the vibration proof by the vibration proof zoom lens 102 of the present example are illustrated in FIGS. 23 to 31.

FIGS. 23A-C, 24A-C, 26A-C, 27A-C, 29A-C, and 30A-C show spherical aberration graphs, astigmatism graphs, and distortion aberration graphs, respectively. FIGS. 23A-23C and 24A-24C show aberrations at the time of focusing the infinity objection distance and the objection distance of 0.5 mm at the wide angle limit, respectively, FIGS. 26A-26C and 27A-27C show aberrations at the time of focusing the infinity objection distance and the objection distance of 0.5 mm at the intermediate focal length, respectively, and FIGS. 29A-29C and 30A-30C show aberrations at the time of focusing the infinity objection distance and the objection distance of 0.5 mm at the telephoto limit, respectively.

Figure 25:
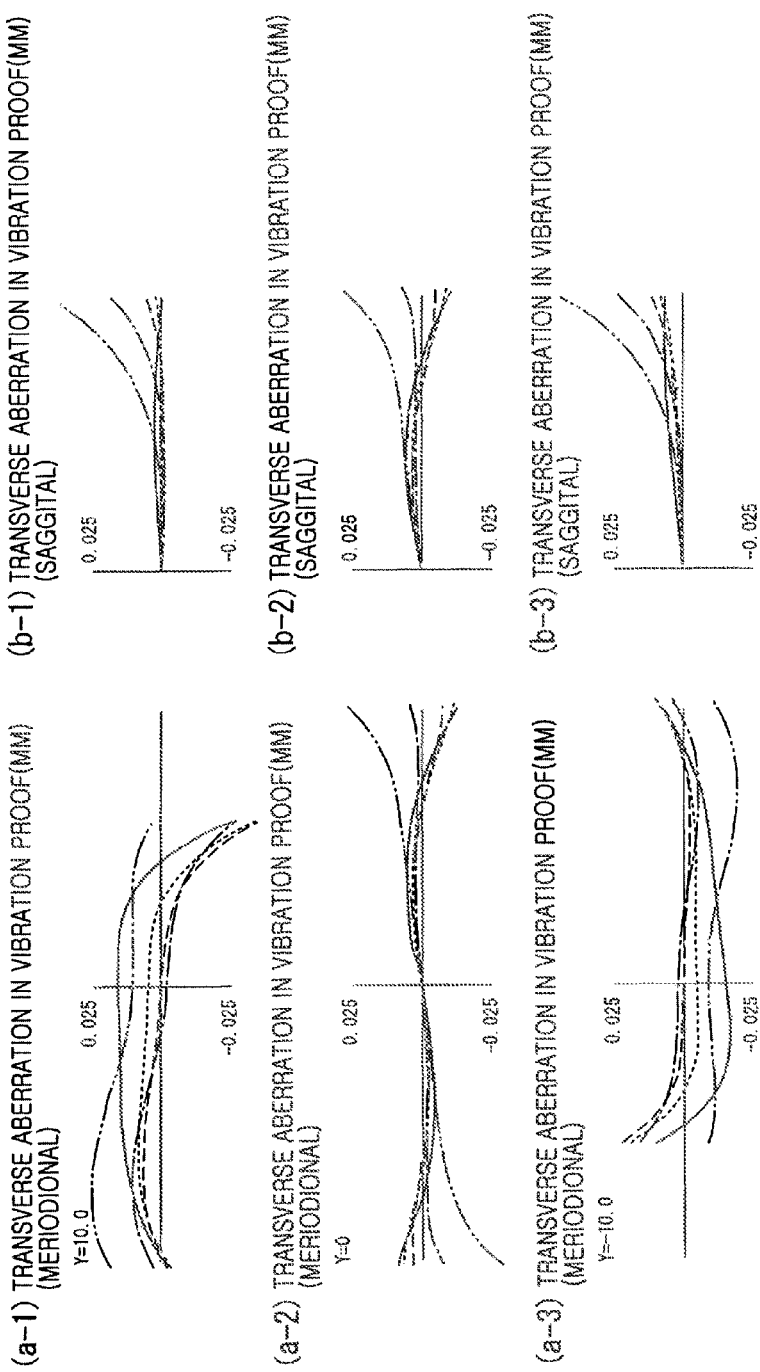
FIG. 25 is an aberration view showing a transverse aberration according to the exemplary embodiment of FIG. 4A-4C when it vibration-proofs at the wide angle limit.
Figure 26:
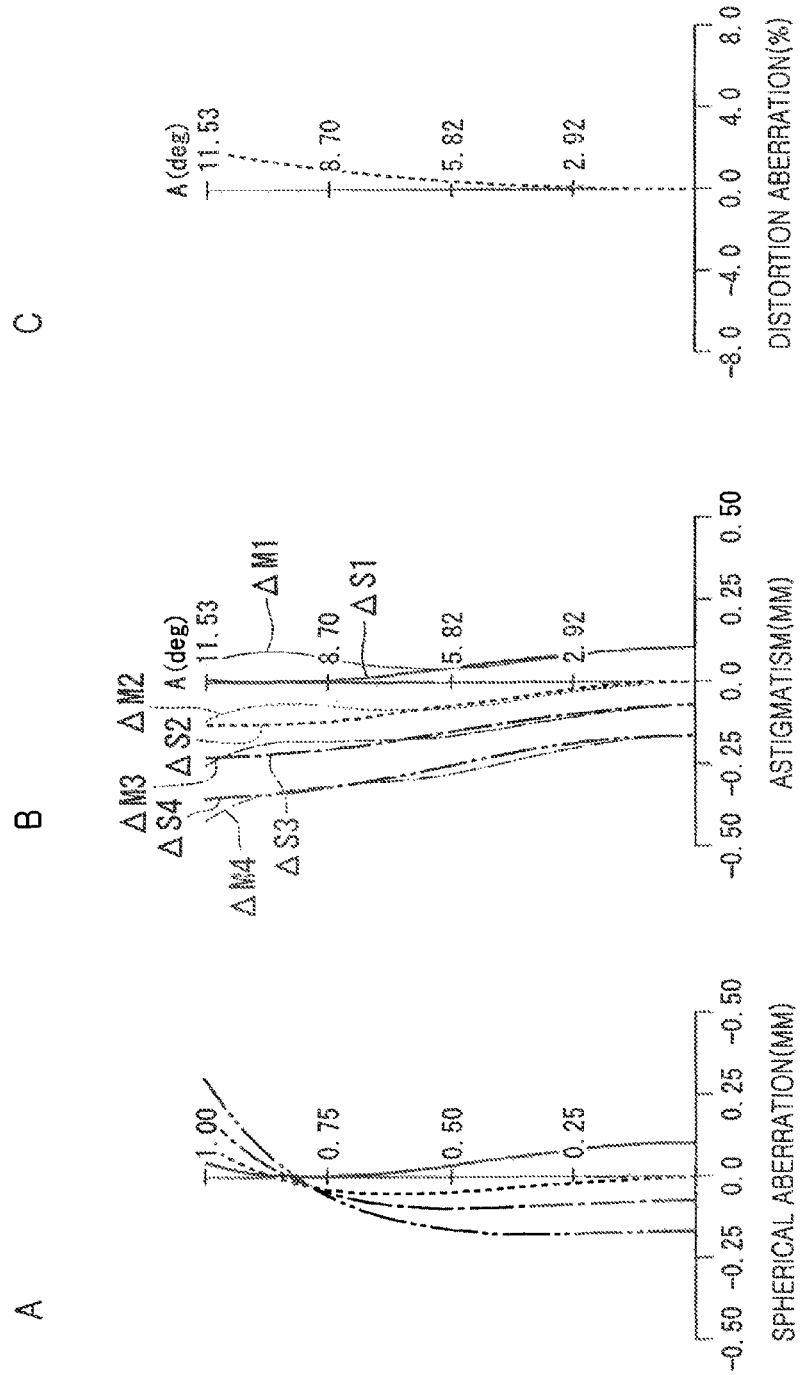
FIGS. 26A-26C are aberration views showing a spherical aberration, an astigmatism, and a distortion aberration of the vibration proof zoom lens according to the exemplary embodiment of FIGS. 4A-4C when it focuses on the infinity object distance at the intermediate focal length, respectively.
Figure 27:
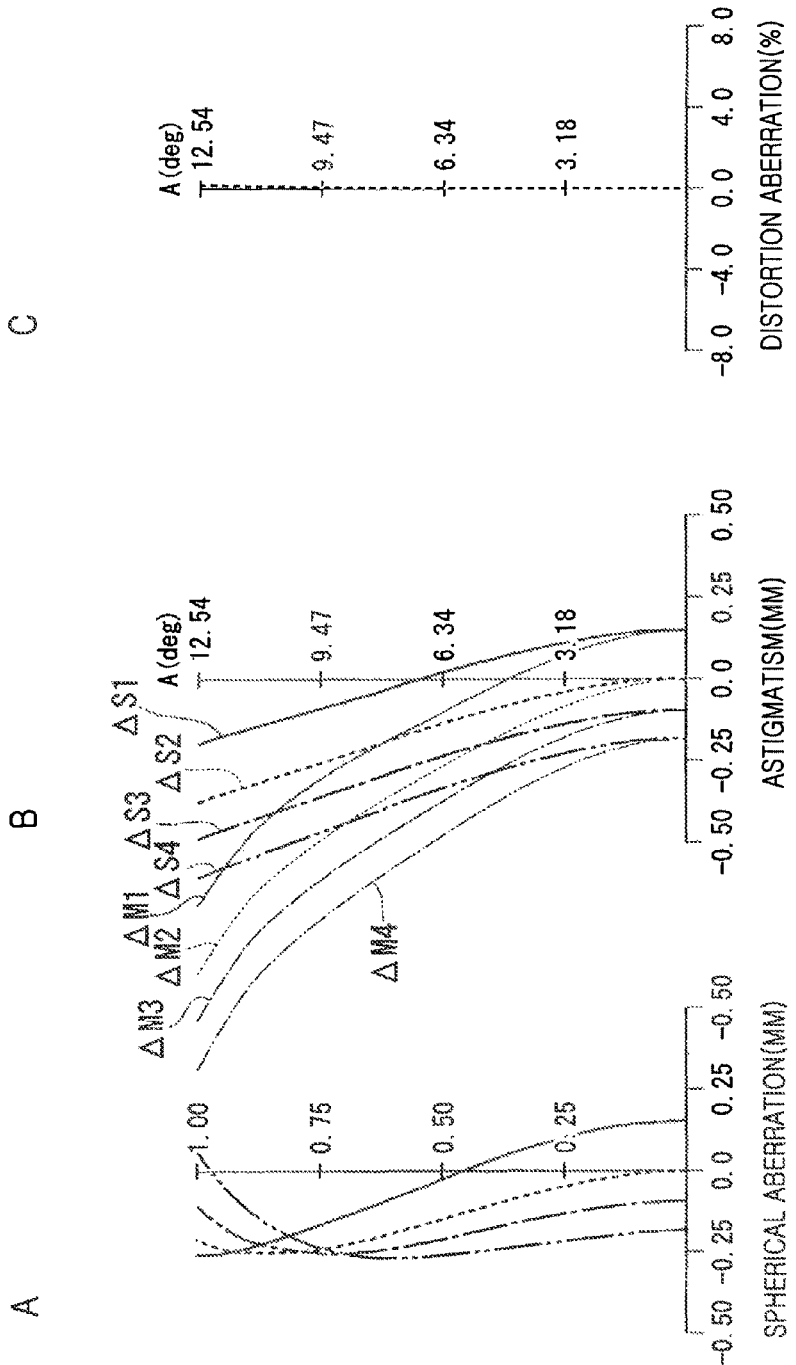
FIGS. 27A-27C are aberration views showing a spherical aberration, an astigmatism, and a distortion aberration of the vibration proof zoom lens according to the exemplary embodiment of FIGS. 4A-4C when it focuses on the object distance of 0.5 m at the intermediate focal length, respectively.
Figure 28:
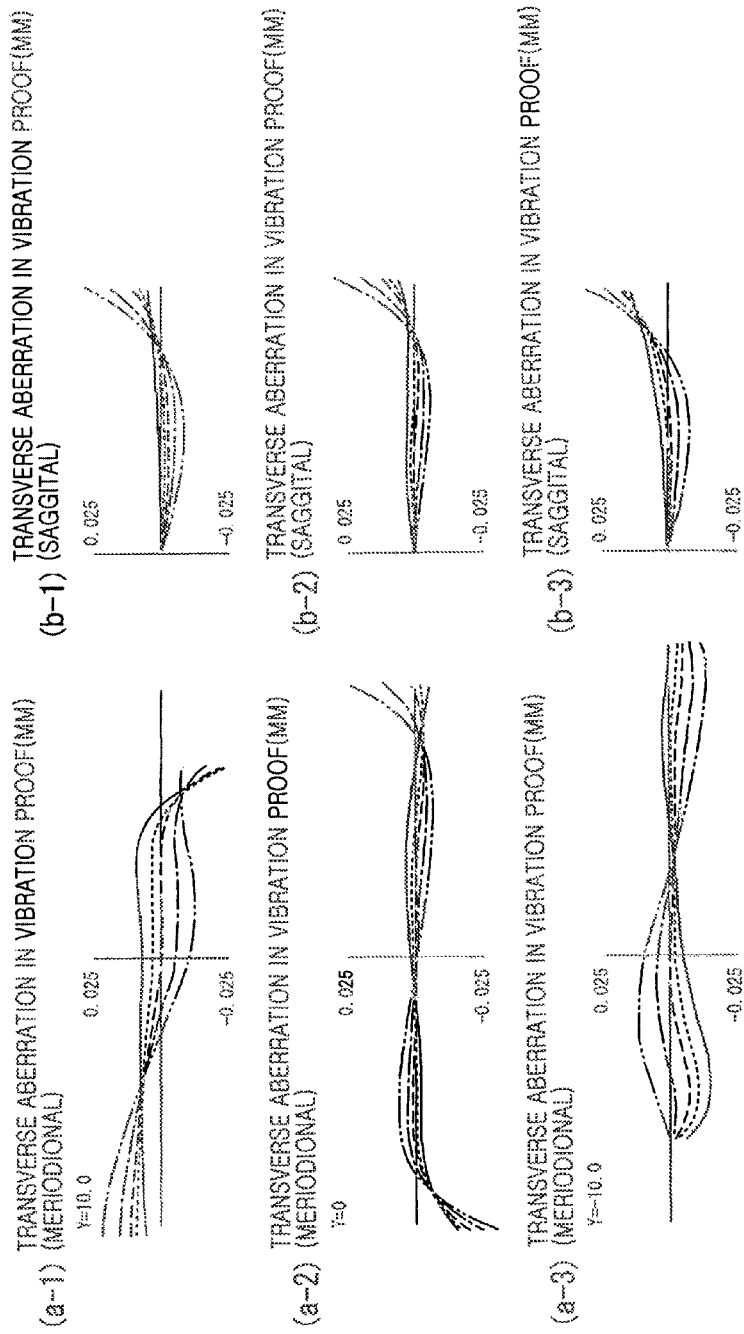
FIG. 28 is an aberration view showing a transverse aberration according to the exemplary embodiment of FIGS. 4A-4C when it vibration-proofs at the intermediate focal length.
Figure 29:
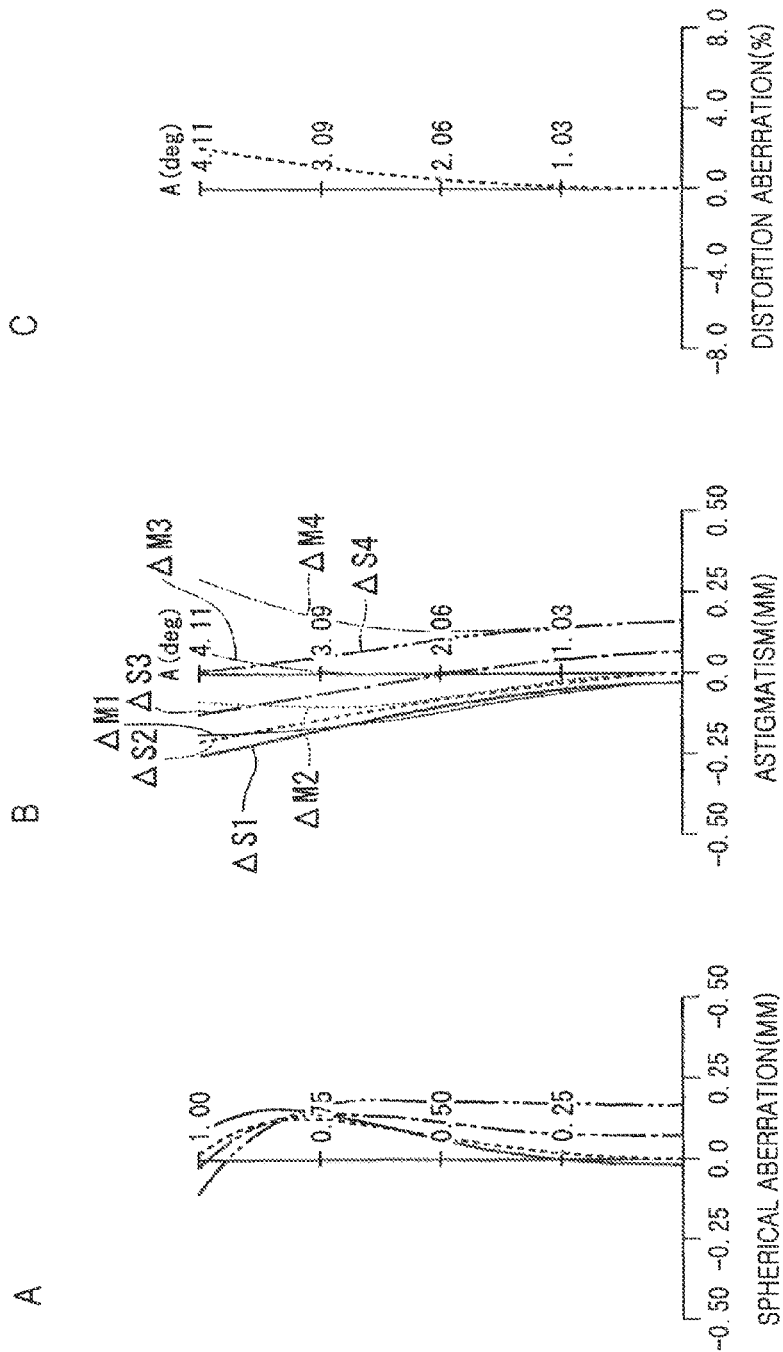
FIGS. 29A-29C are aberration views showing a spherical aberration, an astigmatism, and a distortion aberration of the vibration proof zoom lens according to the exemplary embodiment of FIGS. 4A-4C when it focuses on the infinity object distance at the telephoto limit, respectively.
Figure 30:
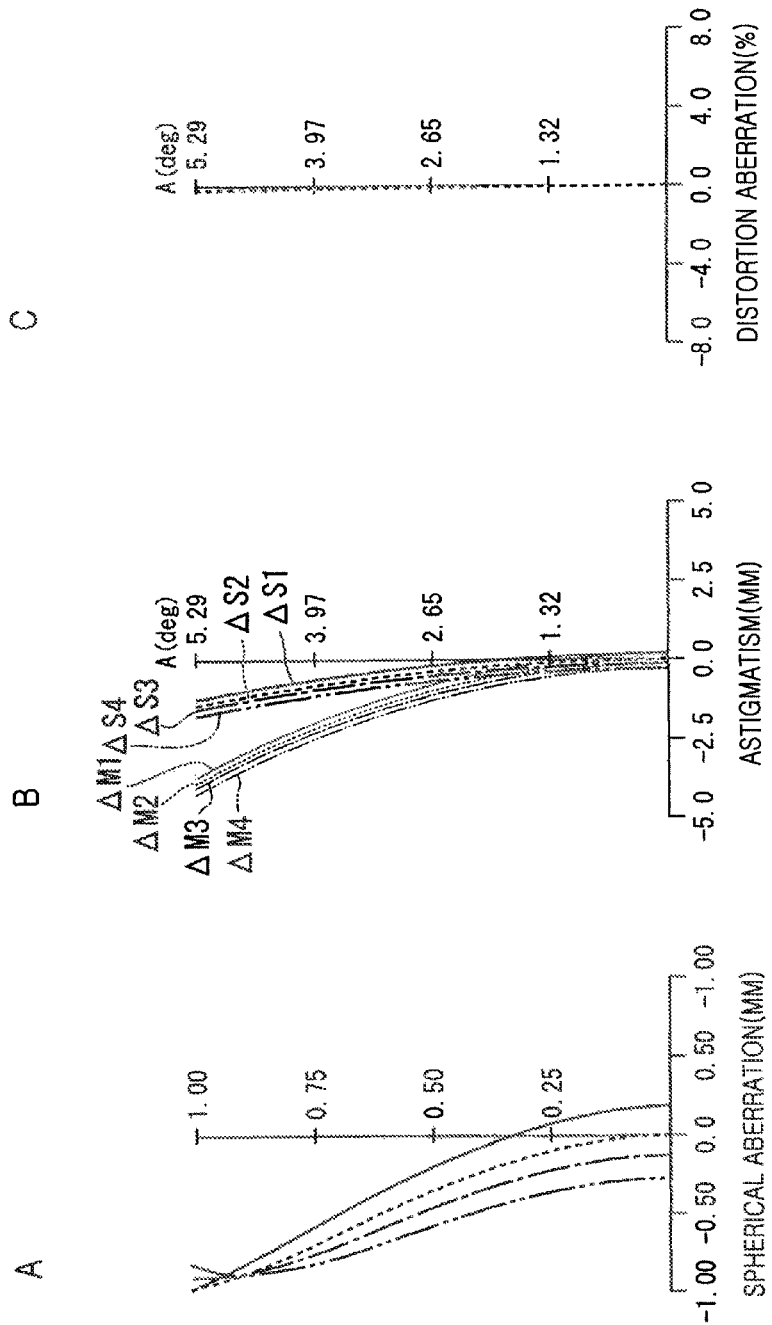
FIGS. 30A-30C are aberration views showing a spherical aberration, an astigmatism, and a distortion aberration of the vibration proof zoom lens according to the exemplary embodiment of FIGS. 4A-4C when it focuses on the object distance of 0.5 m at the telephoto limit, respectively.
Figure 31:
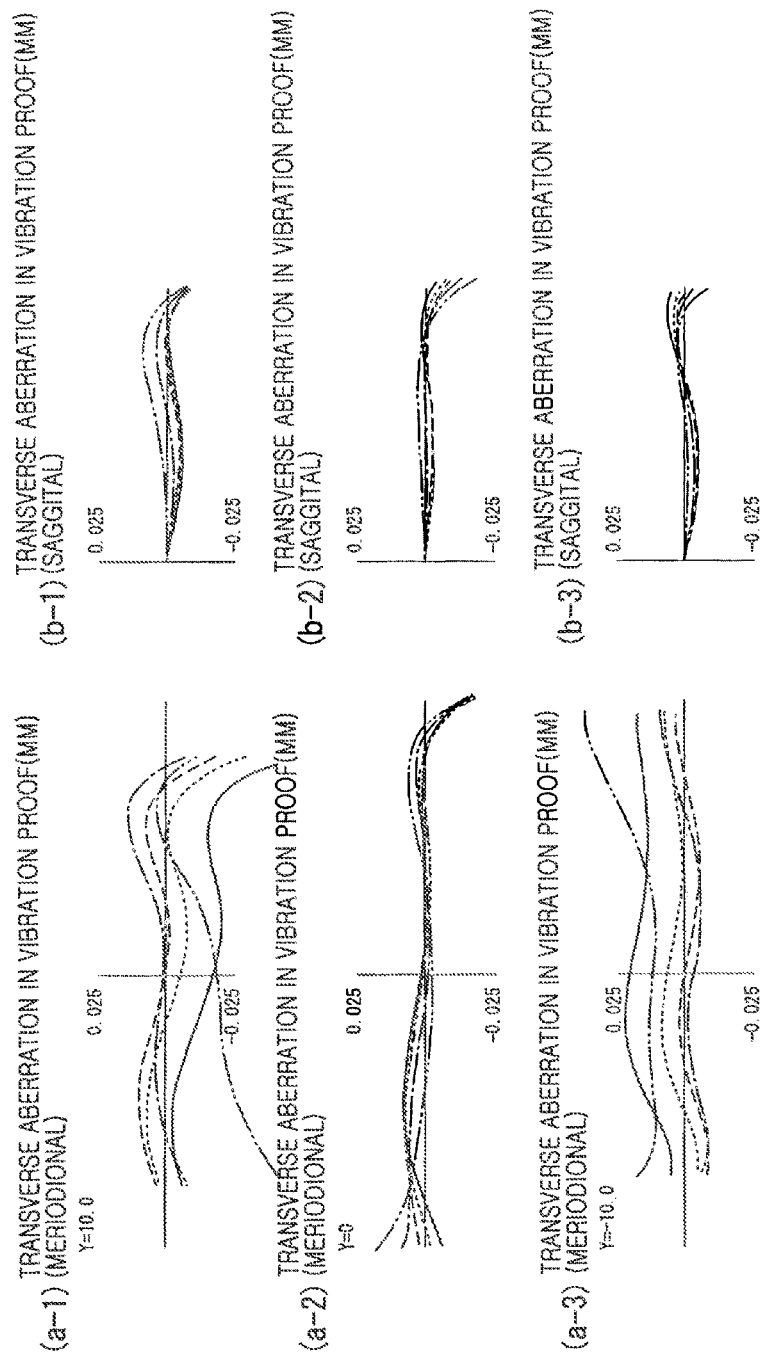
FIG. 31 is an aberration view showing a transverse aberration according to the exemplary embodiment of FIGS. 4A-4C when it vibration-proofs at the telephoto limit.

FIGS. 25, 28 and 31 include aberration graphs showing transverse aberrations in the vibration proof operations at the wide angle limit, the intermediate focal length and the telephoto limit, respectively.

Referring to FIGS. 23A to 31, it can be appreciated that with the vibration proof zoom lens 102 (see FIGS. 4A-4C) of the present example, the spherical aberrations, the astigmatisms, and the distortion aberrations were well corrected within the object distance from the infinity to the 0.5 m at the wide angle limit, the intermediate focal length and the telephoto limit and at the same time, the transverse aberrations in the vibration proof were good.

Although various embodiments of the present inventive concept have been explained by the exemplary embodiments and drawings as described above, it is not limited to the foregoing exemplary embodiments. The present teaching can be readily applied to other types of apparatuses and many, alternatives, modifications, and variations will be apparent to those skilled in the art.

Thus, the scope of the present inventive concept is not to be construed as being limited to the description of the exemplary embodiments, and is to be construed by the attached claims and equivalents.

What is claimed is:

1. A vibration proof zoom lens, comprising a first lens group with a positive refractive power, a second lens group with a negative refractive power, and a succeeding group having a positive refractive power as a whole, which are arranged in order from an object side of the lens,
    wherein the succeeding group has a first part group with a positive refractive power, a second part group with a positive refractive power, the second part group comprising more than one cemented lens to form at least two cemented surfaces, and a third part group with a negative refractive power, which are disposed in order from the object side of the lens,
    wherein in variable-magnifying from a wide angle limit to a telephoto limit, a clearance between the first lens group and the second lens group is increased and at the same time, a clearance between the second lens group and the succeeding group is decreased,
    wherein a focusing from an infinity side to a close side is performed by moving the first part group toward an image side of the lens,
    wherein a vibration proof operation is performed by moving the third part group in a direction perpendicular to an optical axis to change an image position, and wherein the following condition equations (1), (2) and (3) are satisfied:

$$0.1 < f_{3a}/f_t < 0.3 \quad (1)$$

$$0.15 < f_{3b}/f_t < 0.35 \quad (2)$$

$$0.05 < |f_{3c}|/f_t < 0.25 \quad (3)$$

where $f_{3a}$ is a focal length of the first part group, $f_{3b}$ is a focal length of the second part group, $f_{3c}$ is a focal length of the third part group, and $f_t$ is a focal length of all systems at the telephoto limit.

2. The lens of claim 1, wherein the second part group comprises a cemented lens consisting of two positive lenses and one negative lens.

3. The lens of claim 1, wherein the third part group comprises one negative lens and one positive lens.

4. The lens of claim 1, wherein the succeeding group comprises:
   a third lens group comprising the first part group, the second part group and the third part group; and
   a fourth lens group disposed on an upper side of the third lens group, the fourth lens group having a positive refractive power and changing an air space of the image side in the variable-magnifying,
   wherein in the variable-magnifying from the wide angle limit to the telephoto limit, a clearance between the third lens group and the fourth lens group is decreased, and
   wherein the following condition equations (4) and (5) are satisfied:

$$0.05 < f_{Ra}/f_t < 0.3 \quad (4)$$

$$0.1 < f_{Rb}/f_t < 0.35 \quad (5)$$

where $f_{Ra}$ is a focal length of the third lens group at the telephoto limit and $f_{Rb}$ is a focal length of the fourth lens group.

5. The lens of claim 1,
   wherein the first lens group comprises one positive lens, which has an aspherical surface with a positive refractive power becoming smaller as getting away from the optical axis.

6. The lens of claim 1,
   wherein in the variable-magnifying from the wide angle limit to the telephoto limit, a clearance between the first part group and the second part group is increased.

7. The lens of claim 1, wherein the following condition equations (6) and (7) are satisfied:

$$0.25 < f_1/f_t < 0.65 \quad (6)$$

$$0.04 < |f_2|/f_t < 0.1 \quad (7)$$

where $f_1$ is a focal length of the first lens group and $f_2$ is a focal length of the second lens group.

8. The lens of claim 1,
   wherein the third lens group further comprises a fourth part group having a negative refractive power at an object side of the first part group,
   wherein the following condition equation (8) is satisfied:

$$0.5 < |f_{3f}|/f_t < 5.0 \quad (8)$$

here, $f_{3f}$ is a focal length of the fourth part group.

9. The lens of claim 8, wherein the fourth part group comprises a negative lens.

10. The lens of claim 8, wherein the fourth part group comprises a negative meniscus lens having a convex surface toward the object side.

11. The lens of claim 2, wherein the third part group comprises one negative lens and one positive lens.

12. The lens of claim 2, wherein the succeeding group comprises:
   a third lens group comprising the first part group, the second part group and the third part group; and
   a fourth lens group disposed on an upper side of the third lens group, the fourth lens group having a positive refractive power and changing an air space of the image side in the variable-magnifying,
   wherein in the variable-magnifying from the wide angle limit to the telephoto limit, a clearance between the third lens group and the fourth lens group is decreased, and
   wherein the following condition equations (4) and (5) are satisfied:

$$0.05 < f_{Ra}/f_t < 0.3 \quad (4)$$

$$0.1 < f_{Rb}/f_t < 0.35 \quad (5)$$

where $f_{Ra}$ is a focal length of the third lens group at the telephoto limit and $f_{Rb}$ is a focal length of the fourth lens group.

13. A photographing apparatus comprising a vibration proof zoom lens comprising: a first lens group with a positive refractive power; a second lens group with a negative refractive power; and a succeeding group having a positive refractive power as a whole, which are arranged in order from an object side of the lens,
   wherein the succeeding group has a first part group with a positive refractive power, a second part group with a positive refractive power, the second part group comprising more than one cemented lens to form at least two cemented surfaces, and a third part group with a negative refractive power, which are disposed in order from the object side,
   wherein in variable-magnifying from a wide angle limit to a telephoto limit, a clearance between the first lens group and the second lens group is increased and at the same time, a clearance between the second lens group and the succeeding group is decreased,
   wherein a focusing from an infinity side to a close side is performed by moving the first part group toward an image side,
   wherein a vibration proof operation is performed by moving the third part group in a direction perpendicular to an optical axis to change an image position, and
   wherein the following condition equations (1), (2) and (3) are satisfied:

$$0.1 < f_{3a}/f_t < 0.3 \quad (1)$$

$$0.15 < f_{3b}/f_t < 0.35 \quad (2)$$

$$0.05 < |f_{3c}|/f_t < 0.25 \quad (3)$$

where $f_{3a}$ is a focal length of the first part group, $f_{3b}$ is a focal length of the second part group, $f_{3c}$ is a focal length of the third part group, and $f_t$ is a focal length of all systems at the telephoto limit.

14. A vibration proof zoom lens having an object side and an image side, comprising:
   a first lens group with a positive refractive power and facing an object side of the lens system;
   a second lens group with a negative refractive power disposed between the first lens group and the image side; and
   a succeeding group having a positive refractive power as a whole and disposed between the second lens group and the image side, the succeeding group including:

a first part group with a positive refractive power, a second part group with a positive refractive power, the second part group comprising more than one cemented lens to form at least two cemented surfaces and diposed between the first part group and the image side, and a third part group with a negative refractive power and disposed between the second part group and the image side, wherein in variable-magnifying from a wide angle limit to a telephoto limit, a clearance between the first lens group and the second lens group is increased and at the same time, a clearance between the second lens group and the succeeding group is decreased, wherein a focusing from an infinity side to a close side is performed by moving the first part group toward an image side of the lens, wherein a vibration proof operation is performed by moving the third part group in a direction perpendicular to an optical axis to change an image position, and wherein the following condition equations (1), (2) and (3) are satisfied:

$$0.1 < f_{3a}/f_t < 0.3 \tag{1}$$

$$0.15 < f_{3b}/f_t < 0.35 \tag{2}$$

$$0.05 < |1/f_{3c}|/f_t < 0.25 \tag{3}$$

where $f_{3a}$ is a focal length of the first part group, $f_{3b}$ is a focal length of the second part group, $f_{3c}$ is a focal length of the third part group, and $f_t$ is a focal length of all systems at the telephoto limit.

15. The lens of claim 14, wherein the succeeding group comprises:

a third lens group comprising the first part group, the second part group and the third part group; and a fourth lens group disposed between the third lens group and the image side, the fourth lens group having a positive refractive power and changing an air space of the image side in the variable-magnifying, wherein in the variable-magnifying from the wide angle limit to the telephoto limit, a clearance between the third lens group and the fourth lens group is decreased, and wherein the following condition equations (4) and (5) are satisfied:

$$0.05 < f_{Ra}/f_t < 0.3 \tag{4}$$

$$0.1 < f_{Rb}/f_t < 0.35 \tag{5}$$

where $f_{Ra}$ is a focal length of the third lens group at the telephoto limit and $fR_b$ is a focal length of the fourth lens group.

* * * * *

UNITED STATES PATENT AND TRADEMARK OFFICE
CERTIFICATE OF CORRECTION

| | | |
|---|---|---|
| PATENT NO. | : 9,140,905 B2 | Page 1 of 1 |
| APPLICATION NO. | : 13/332742 | |
| DATED | : September 22, 2015 | |
| INVENTOR(S) | : Misaka | |

It is certified that error appears in the above-identified patent and that said Letters Patent is hereby corrected as shown below:

In the claims

Claim 14, Column 29, Line 5
Delete "diposed" and insert --disposed--, therefor.

Claim 14, Column 29, Line 27
Delete "$0.05 < IIf_{3c} I/f_t < 0.25$" and insert --$0.05 < If_{3c} I/f_t < 0.25$--, therefor.

Claim 15, Column 30, Line 25
Delete "limit and fRb" and insert --limit and $f_{Rb}$--, therefor.

Signed and Sealed this
Fifteenth Day of December, 2015

Michelle K. Lee
*Director of the United States Patent and Trademark Office*